United States Patent [19]

Rogers

[11] 4,170,691
[45] Oct. 9, 1979

[54] STEEL METAL WEB HANDLING METHOD, APPARATUS, AND COIL CONSTRUCT

[76] Inventor: John W. Rogers, c/o 25550 Chagrin Blvd., Cleveland, Ohio 44122

[21] Appl. No.: 713,599

[22] Filed: Aug. 12, 1976

Related U.S. Application Data

[63] Continuation-in-part of Ser. No. 648,533, Jan. 12, 1976, abandoned, which is a continuation-in-part of Ser. No. 612,275, Sep. 11, 1975, abandoned.

[51] Int. Cl.$^2$ .................. B21D 11/20; B21D 31/00
[52] U.S. Cl. .................................. 428/572; 29/413; 29/414; 72/146; 242/56.2; 428/43; 428/571; 428/592; 428/906
[58] Field of Search ............ 72/146; 29/413, 414; 242/56.2; 428/571, 572, 573, 43, 906, 592

[56] References Cited

U.S. PATENT DOCUMENTS

| 281,184 | 7/1883 | Greer | 72/223 |
|---|---|---|---|
| 653,911 | 7/1900 | Heggie | 29/413 X |
| 1,238,356 | 8/1917 | Stokes | 428/43 |
| 1,399,769 | 12/1921 | Hodgkinson | 428/573 X |
| 1,687,938 | 10/1928 | Johnstone | 29/413 |
| 2,607,311 | 8/1952 | Doan | 428/571 |
| 3,124,872 | 3/1964 | Knudel | 29/413 |
| 3,356,465 | 12/1967 | Chambran | 428/573 X |
| 3,564,707 | 2/1971 | Ensign | 29/414 X |
| 4,011,109 | 3/1977 | Gulland et al. | 29/413 X |

FOREIGN PATENT DOCUMENTS 814287 8/1949 Fed. Rep. of Germany .............. 29/413

*Primary Examiner*—Richard E. Schafer
*Attorney, Agent, or Firm*—John F. Carney

[57] ABSTRACT

The disclosure includes method and apparatus for handling elongated webs of sheet metal, and a sheet metal construct formed as an intermediate product and comprising a parent coil pre-divided into a plurality of daughter coils. In one method sequence, separation can be completed by the end user of the coil just before it is fed into a press or the like. In another method sequence, separation is completed during wrapping of the parent coil. In still other sequences, completion of separation can be accomplished at stages intermediate these two. Slitting may be done directly off a mill. Edge trim strip may be wound as part of the parent coil to simplify scrap handling, and may be used to protect the coil in transit.

11 Claims, 41 Drawing Figures

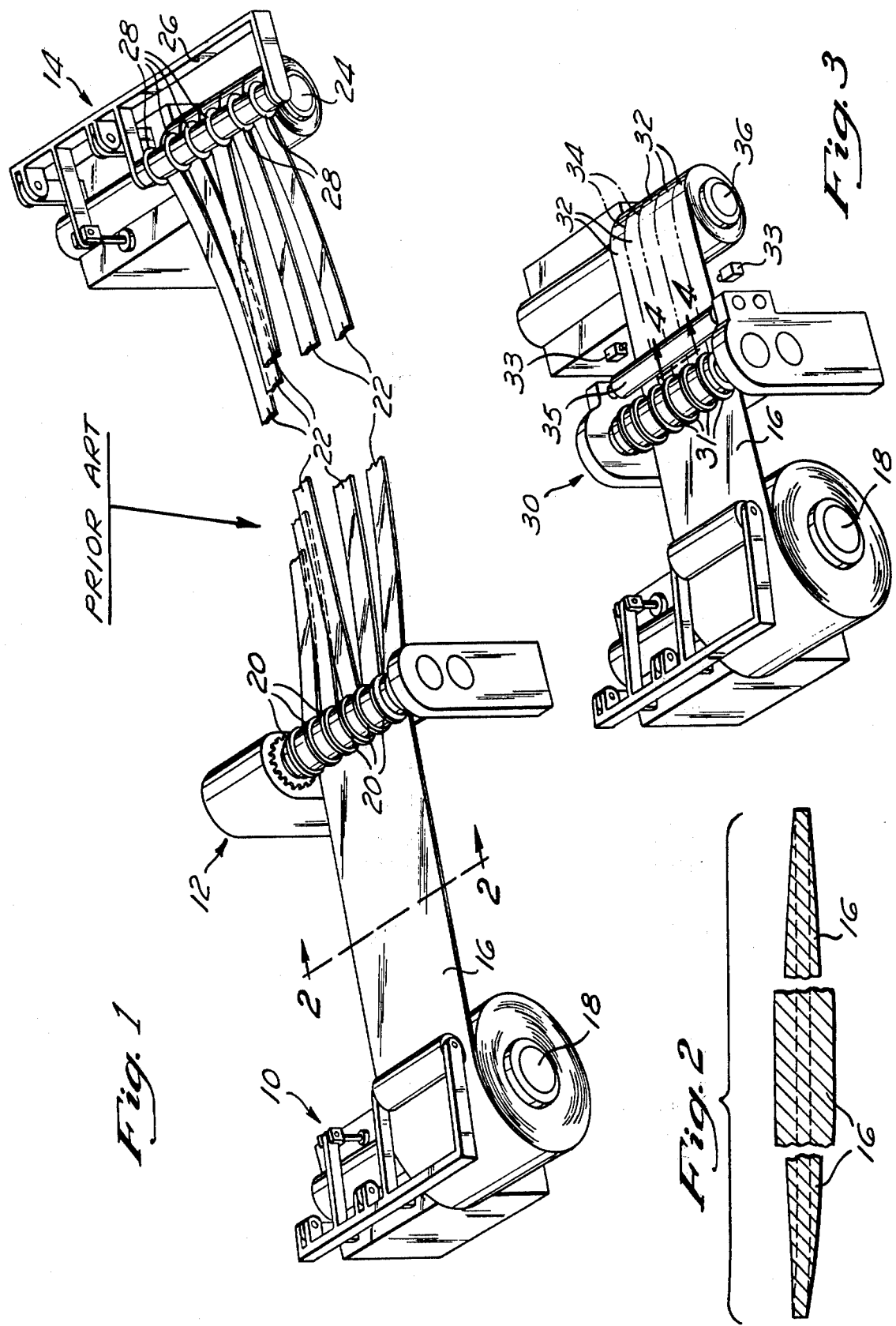

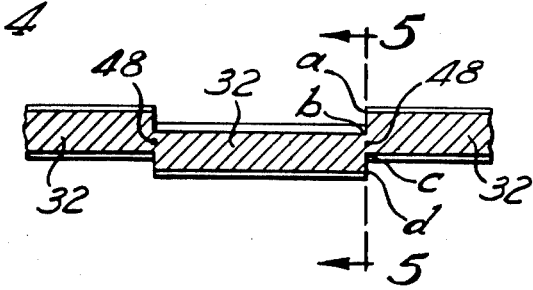
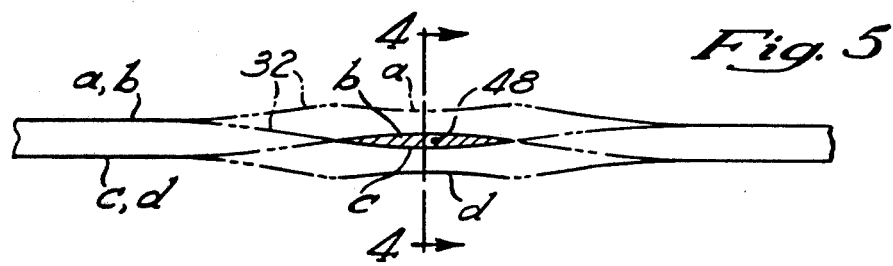
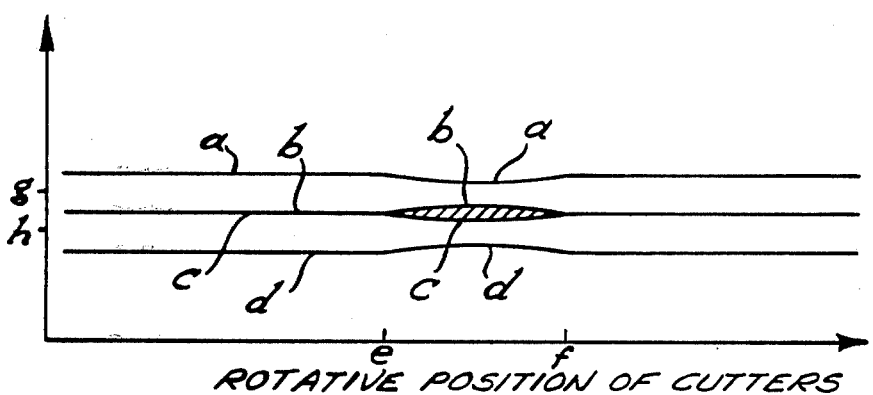
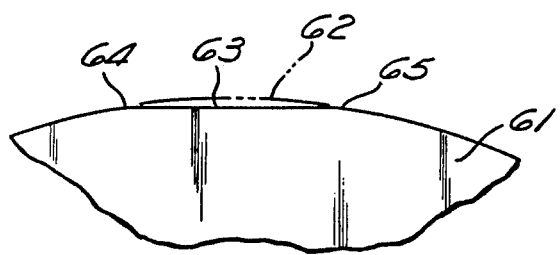

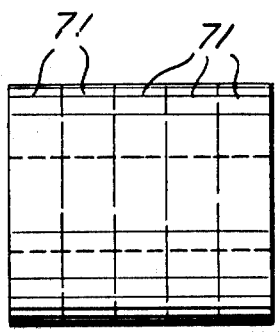
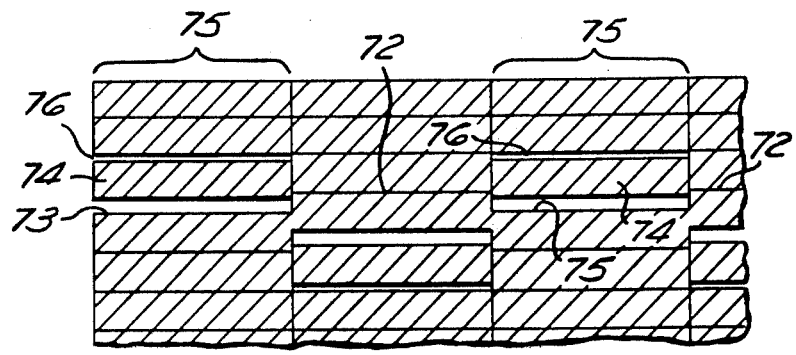
Fig. 8     Fig. 9
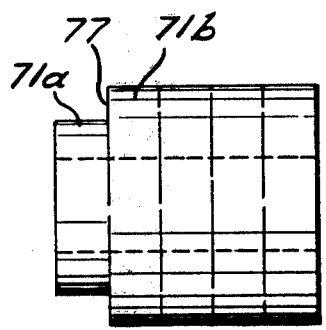
Fig. 10
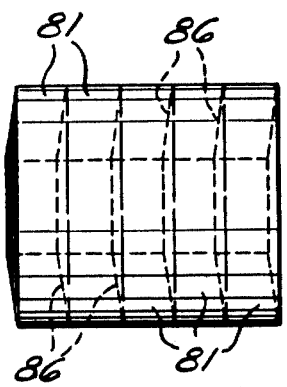
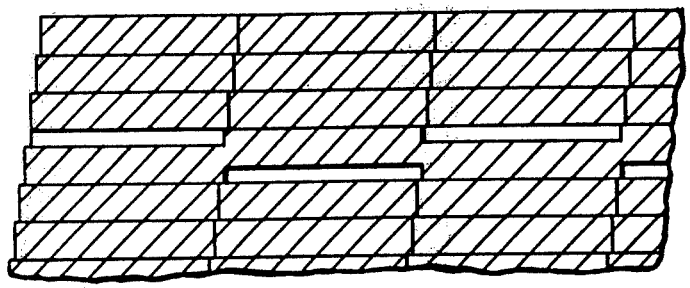
Fig. 11     Fig. 12

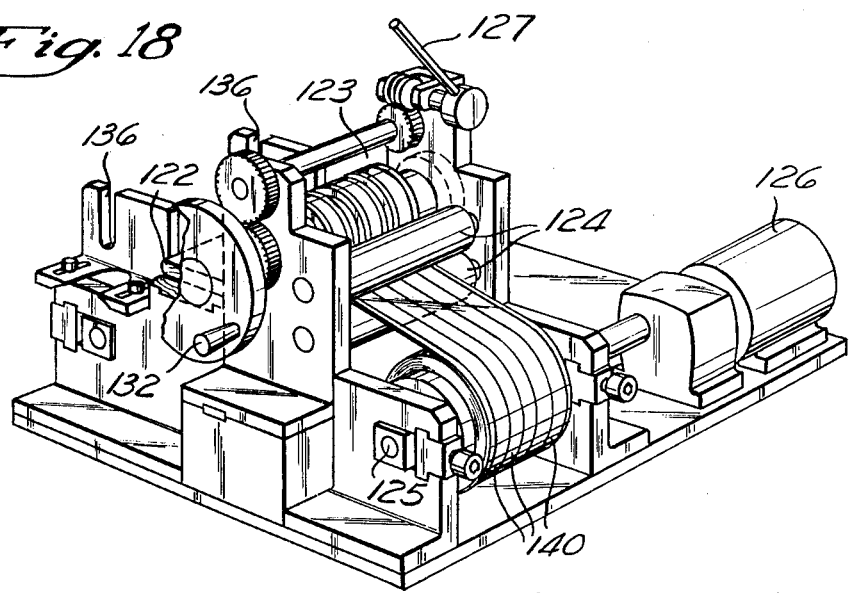
Fig. 18
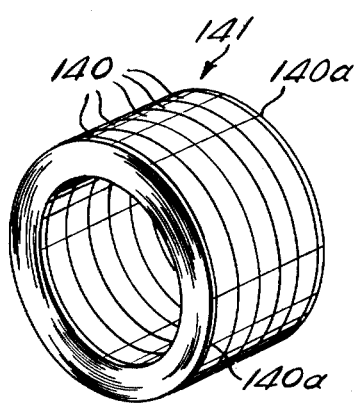
Fig. 19
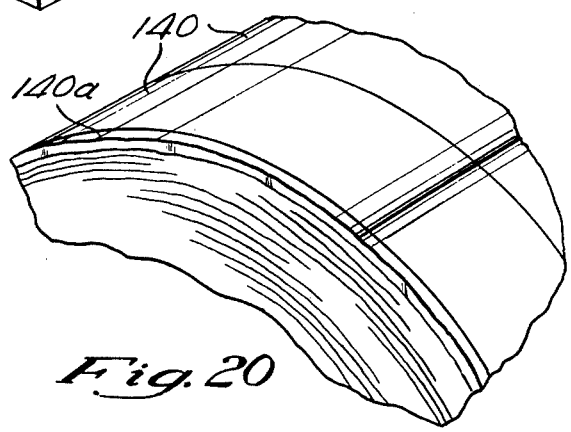
Fig. 20
Fig. 22
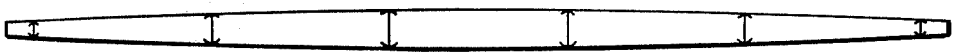
Fig. 21
Fig. 22a

STEEL METAL WEB HANDLING METHOD, APPARATUS, AND COIL CONSTRUCT

PRIOR APPLICATIONS

This application is a continuation-in-part of my prior copending application Ser. No. 648,533, filed Jan. 12, 1976 which in turn is a continuation-in-part of my prior copending application Ser. No. 612,275, filed Sept. 11, 1975, both abandoned.

BACKGROUND OF THE INVENTION

In the manufacture of flat rolled metal it is most convenient and economical to form the web of a much greater width than is normally required by the end user and then slit the web into narrower strips of a suitable width. The metal web is coiled as it is processed, then, in a separate operation, placed on an uncoiler, unwound, trained through a slitter and then rewound as a number of separate narrower strips on the coiler. The slitting operation may be accomplished at the point of manufacture, by middlemen, such as warehousemen, or by the end user of the sheet metal.

Regardless of at what point the coil slitting takes place, inherent characteristics of the sheet metal and conventional coil slitting processes result in a number of difficulties to which the industry has responded in a manner which, in many cases, only solves the problems encountered by producing other, different problems.

For example, although the sheet of metal being slit is generally thought of as having a rectangular cross-sectional configuration, in fact, conventional sheet metal manufacturing processes produce a sheet which is crowned, i.e., is thicker, at its center than at its edges. Obviously, as such a sheet is rewound on a coiler as a series of separate strips following slitting, those strips slit from the center of the sheet are thicker and as a result are rewound more tightly than those strips slit from adjacent the edges of the sheet. This in turn results in so called "slack strands" being formed by the thinner strips between the slitter and coiler. To overcome the problem of slack strands a number of solutions have been advanced, and in fact are found in use today throughout most coil slitting operations.

One approach has been to insert pieces of cardboard or paper between the wraps of those coils positioned outwardly of the center coil to compensate for the differences in thickness of the strips being rewound. This is often performed manually, which is both cumbersome and dangerous, and even where performed mechanically is still cumbersome and requires a specially designed machine. In both cases, the cardboard or paper pieces must be removed later as the strip is decoiled for punching, pressing or other operations.

Two other, related approaches to the problem of slack strands are the looping and festooning of the strands intermediate the slitter and the coiler. Looping requires the provision of a deep pit, which is both inconvenient and expensive, while festooning requires the installation of a series of rolls mounted in towers above the process line, an obviously costly expedient, and in both looping and festooning control of the slack stands is always a problem.

While individual coilers could be provided for each of the strips resulting from the coil slitting operation, as a practical matter the expense of such provision will usually be prohibitive. Another approach which is based upon individual treatment of the slits strips but which does not require separate coilers is slip core winding. In this process, the strips are wound on nonmetallic cores that are allowed through friction to wind at a speed commensurate with the thickness of the strips. However, the cores used in this operation are in themselves expensive and must be retained within and shipped with the coils, and in addition they may distort under load and cause irregular winding.

Another problem characteristic of conventional coil slitting operations which is independent of the crowned configuration of the metal sheet and would, therefore, exist even if the sheet were perfectly rectangular in cross section, is interleaving of the strip edges as they are rewound on the coiler. Interleaving in turn results in damage to the edges of coil, loss of production time resulting from the necessity of manually separating interleaved coils and difficulties in feeding such coils, because of their damaged edges, through machinery such as punching presses and the like.

To prevent interleaving during rewinding, an attempt is generally made to keep the individual strips separate from each other. This may be accomplished by positioning spacer plates between coils or through the use of a series of discs which are mounted on a shaft separate from the coiler and allowed to penetrate between the coil edges as they are rewound.

Regardless of the particular manner in which separation is attained, it will be seen that separation requires lateral displacement of the individual strips from each other. This in turn requires that the coiler be spaced a considerable distance from the separator to allow the strips to fan out gradually from the slitter to the required spacing at the coiler. Ordinarily, to obtain a total lateral displacement of approximately two to three inches it is necessary to provide from fifteen to twenty feet of spacing between the slitter and the coiler.

From the above it will be apparent that conventional coil slitting operations possess many inherent disadvantages and present many problems which have traditionally either been accepted or only partially solved, often at the expense of introducing other difficulties and new problems into the process. A need therefore, has long existed for a new approach to coil slitting which obviates the problems of slack strands and coil interleaving and all of their attendant disadvantages.

SUMMARY OF THE INVENTION

In accordance with the present invention coil slitting is accomplished in a two step operation which permits all of the strips slit from a single sheet to be rewound as a unit and thereby obviates the traditional coil slitting problems of slack strands and coil interleaving.

Although cutting web material in more than one cutting step is not unknown (see for example, U.S. Pat. No. 876,008), including cutting of metal strips in more than one step (U.S. Pat. Nos. 3,628,710 and 3,641,853), in such prior art cutting processes completion of cutting is accomplished before rewinding of the sheet being cut has commenced. As a result, the same problems of slack strands and interleaving that occur in conventional, one step cutting processes would occur in a two step process where the final cutting step is accomplished before rewinding has commenced, to the same extent that they would have occurred had the cutting been accomplished in only one step.

In contrast, in accordance with the present invention, as the unslit sheet is unwound from the uncoiler and trained through the slitter, the sheet is only partially slit or cut, or is fully slit and immediately lightly reconnected to provide the equivalent of partial slits or cuts, resulting in a set of interconnected strips which are delivered to the coiler as a single sheet. Thereafter, after rewinding has commenced, that is, at any time between the time when the interconnected strips have begun to wrap the coiler reel and such time as the coils are unwound for use, the partial cuts or equivalents made at the slitter may be completed to provide the separate, narrower coils desired. Since, until the partial cuts or equivalents made at the slitter are completed, the interconnected strips behave as a single sheet, they can be treated as such during coiling without fear of slack strands, strip interleaving and all of their attendant problems and difficulties.

In accordance with one embodiment of the invention, complete separation of the coils is not made until the coils are ultimately unwound by the end user as, for example, they are fed into a press. In accordance with this embodiment, an additional advantage is gained over and above those discussed above in that individual banding and handling of separate coils following the slitting operation are eliminated. Or the coils may be individually broken off as units, preferably by the end user, rather than being individually unwound in which case individual handling may both (1) be more efficient than in conventional practice and (2) require little change from conventional practice in utilizing ordinary handling equipment such as cranes or lift trucks to transport and position individual slit coils.

In accordance with another embodiment of the invention, completion of the partial cut is made during the first wrap of the coils on the coiler mandrel. In accordance with this embodiment of the invention, final separation is made preferably as close as possible to the beginning of the second wrap, allowing the first wrap of interconnected sheets to thereby act as a wrapper for the separated coils.

Regardless of whether final separation is accomplished on the coiler or at some later stage, the final parting arrangement can be relatively simple.

In a conventional slitter opposed pairs of rotary cutters are used at each cut, which results in adjacent edges of the slit coils being momentarily displaced from each other in a direction perpendicular to the plane of the sheet. In the practice of the present invention, the same momentary displacement may occur at longitudinal locations where slitting is complete, but the resulting series of interconnected strips may also experience a degree of relative displacement of adjacent edges at longitudinal locations where slitting is not complete, which displacement may be maintained until the adjacent strips are separated, unless the strips are knocked back down into a common plane while maintaining the connection between slits, as is presently preferred. Sciving tools can then be used to separate the strips. Or, the adjacent edges of the strips may recover from their momentary displacement at all locations in the practice of certain forms of the invention, particularly where the sheet is fully slit and then immediately lightly reconnected.

If the connection after partial cutting or equivalent is sufficiently delicate, a contoured bending bar or knockdown bar can be utilized bearing on the faces of the interconnected strips, if desired with an endless belt or belts interposed between the bar and the faces of the strips to eliminate scratching and other damage to the strips, to break the remaining bonds between adjacent strips by pressing their edges back towards a common plane or by pressing them momentarily out of a common plane. Or sciving tools can be used to separate the strips either upon coiling after slitting or upon final uncoiling. Or, the daughter coils formed by the partial slitting or equivalent can be broken away from the parent coil, either simultaneously or one at a time.

Of course, other separating tools can also be utilized, including, but not limited to, sharpened rotary cutters slitting the connections between adjacent strips as the strips are coiled following partial slitting or at any time following commencement of coiling but before end use.

It will also be seen that under certain circumstances an additional piece of equipment for completing the cut may be unnecessary. Thus, where the partial cutting operation results in a series of interconnected strips having the still-connected portions of their edges displaced from each other in a direction approximately perpendicular the plane of the strips, by controlling rewind tension the remaining bonds between the sheets may be fractured as they are wrapped tightly on the coiler reel. Or, the partial cutting or equivalent may result in a connection which will maintain itself until the connected strips are bent around the winding axis, as upon winding of the connected strips, at which point fracture may occur due to the bending incident to winding. Or, the connection may satisfactorily yield only to differential unbending around the winding axis, as upon unwinding of one of the connected strips while the other remains wound. Or, the connection may or may not resist such differential unbending to an objectionable degree, but may nevertheless satisfactorily yield to imposition of spreading forces between the strips because of the "stiff plane" effect of the connected strips in resisting such spreading forces. Or, combination of such bending or unbending together with such spreading may be employed, as upon unwinding by pulling the unwinding reach in an unwind path that has a vector component that is parallel to the axis of the coil, or by simply tilting the roll axis away from the horizontal and toward to a vertical position to thereby allow gravity to assert such a pull. Or, the daughter coils may be broken away from the parent coil, either simultaneously or one at a time, without the use of special tools but simply by impact or pressure, as upon being dropped on or forced against a flat or stepped surface, or upon being struck head-on or glancingly by an industrial truck fork or by a crane hook or the like, or simply by sheer weight when support by a mandrel or the like is removed from a daughter coil in some cases where heavy coils have relatively infrequent and/or highly weakened tacking.

The configurations of the cuts made during the partial slitting operation or equivalent are susceptible to variations within the scope of the present invention. For example, the cutters can be provided with small, profiled flats ground into a face of the cutter adjacent its edge, thereby providing tacks or connections across the slits made by the cutter. Special shapes other than flats can be used to accomplish the tacking, as described below.

In a variation, the cutters may be arranged to run eccentrically very slightly and adjusted vertically so that alternate complete slitting and incomplete slitting is accomplished. The incomplete slits between completely slit sections would then be separated in any of the different separating processes described above.

In another variation, the arbor of the upper cutter could be mounted for a slight amount of vertical movement, ordinarily on the order of a few thousandths of an inch, and cam or otherwise controlled to provide a periodic lifting of the arbor and cutters mounted thereon to tack across the slitting each time the arbor is lifted.

In another variation, flats on the upper and lower cutters can be brought into and out of rotative register with each other to alternately accomplish full slitting or tacking.

In still another variation, the cutters can be adjusted vertically so that the sheet is sheared just short of the point of fracture in a continuous, uninterrupted fashion, or as called for when sensors indicate incipient or actual nonuniformity of wrap during full slitting. This alternative is applicable, for instance, when completion of separation is made during the first wrap of the coils on the coiler mandrel. Separation of the strips at the coiler can take place in any of the methods described above.

As indicated above, instead of partially slitting, the cutters may be arranged to continuously completely slit followed however by immediate partial reconnection at a rolling station just beyond the slitting cutters so as to thus, equivalently to partial slitting, maintain the edges of adjacent pre-slit strips connected together during winding.

In the present invention, the slitter and coiler of the slitting line can be related in a new way in which relatively close coupling between slitter and coiler exploits and, so to speak, "captures" the momentary condition of tracking in parallel which is imposed on the edges of the daughter-coils-to-be by the action of the slitting rolls. Close coupling is therefore a positive characteristic of the preferred operation of the invention.

As noted above, one major advantage of the partial slitting, or equivalent, of the present invention is the elimination of the problem of interleaving. As also noted above, the conventional approach to this problem is the use of separators between the slit strips, which in turn necessitates the positioning of the slitter from the coiler at a considerable distance to allow the slit strips to fan out to the lateral displacement necessary to attain separation. Since lateral displacement is no longer necessary when slitting in accordance with the present invention, the requirement that the slitter be spaced a considerable distance from the coiler is eliminated with a consequently much more compact process line and a resultant substantial saving in floor space. The requirement of considerable spacing is not only eliminated but significant operating improvements are achieved by the converse of considerable spacing—a close-coupled relationship between slitter and coiler. Slitting directly from a rolling mill becomes feasible, such as at the last stand of a five-stand tandem cold mill or at a temper mill.

Where final separation is performed by the end user, the elimination of individual banding and handling of separate coils is a major advantage of the invention. Instead, the original parent coil may be formed into a coil construct comprising an array of daughter coils which can be handled together until readily separated by the end user or the warehouser or other middleman. A particular advantage is the improved handling of scrap, and improved protection of coils in trans-shipment. Edge trim can be wound as disc-like coils at each end of the array of regular daughter coils, rather than having to be balled, chopped or wound in the conventional manner. These disc-like coils then serve to protect the edges of the endmost regular daughter coils during shipment, and can be readily broken away at the site of coil use and, in some applications, even handled as a unit until remelted or reclaimed.

Final separation of this construct can be accomplished by individually unwinding one after another of the daughter coils which can be supported together on a single mandrel or unwinding stand to be successively (or even simultaneously) presented and fed to a working line or lines. Or, the daughter coils may be broken off as units prior to unwinding. This can optionally be done with breakaway grabs carried by cranes or lift trucks or by their own carriages or the like, so that the daughter coils can be handled by the end user in an efficient manner but in such a way as to be compatible with past procedure in handling individual coils.

Even with the complete elimination of edge interleaving, edge overhang can occur—a condition where a turn of a daugther coil being uncoiled is overhung by a radially outward turn of an adjacent daughter coil so that interference between the edges results. A feature of the present invention eliminates this condition by "step-tracking" the daughter coils on themselves, as more fully explained below. According to another feature, edge overhang is eliminated by dishing the daughter coils. However, in the presently preferred approach is experimental trials, neither "step-tracking" as such, nor dishing is utilized, but natural tracking upon winding is nevertheless sufficient to entirely avoid edge overhang and provide good coil alignment with breakable interconnections between daughter coils disposed for clean shearing action as upon lateral loading of adjacent daughter coils in opposed directions.

From the above and from the following detailed description, it will be seen that the present invention provides an entirely new approach to coil slitting operations and eliminates many difficulties, disadvantages and problems associated with conventional processes by not attempting to combat these problems, but by simply obviating their source. Further advantages of the invention will appear from the following description.

BRIEF DESCRIPTION OF THE DRAWINGS

FIG. 1 is a perspective view of a prior art slitting line;

FIG. 2 is a cross-sectional view on line 2—2 of FIG. 1;

FIG. 3 is a perspective view showing a slitting line in accordance with the present invention;

FIG 4 is an enlarged cross-sectional view taken on the plane of line 4—4 of FIGS. 3 and 5;

FIG. 5 is a cross-sectional view taken on the plane of line 5—5 of FIG. 4;

FIG. 6 is a diagram of the momentary positions at the slitting nip of the edges seen in FIGS. 4 and 5 at different rotative positions of the slitting rolls;

FIG. 7 is a fragmentary view of the edge of a relieved cutter which the invention may employ;

FIG. 7a shows the edge of another relieved cutter which the invention may employ;

FIG. 8 is a side elevation of an array of daughter coils;

FIG. 9 is a schematic fragmentary cross-sectional view, ignoring sheet crowning, of the upper left edge of the coil array seen in FIG. 8, taken on the plane of the paper;

FIG. 10 is a view similar to FIG. 8 with one of the daughter coils partially removed;

FIG. 11 is a side elevation of another array of daughter coils;

FIG. 12 is a schematic fragmentary cross-sectional view, ignoring sheet crowning, of the upper left edge of the coil array seen in FIG. 10, taken on the plane of the paper;

FIG. 18 is a perspective view of a working model of the invention;

FIG. 19 is a perspective view of a coil construct contemplated by the invention;

FIG. 20 is a fragmentary detail of FIG. 19;

FIGS. 21 and 22 are schematic cross-sectional views taken across the straight reach of slit strip seen in FIGS. 18 and 23 at different points prior to the wrapping thereof to form the coil construct;

FIG. 22a is a schematic cross-sectional view taken across the straight reach of slit strip seen in FIG. 23 prior to the wrapping thereof, but when the machine is set up somewhat differently than when it produces strip having the cross-sections schematically illustrated in FIGS. 21 and 22;

FIG. 28a is a very schematic cross-sectional view, ignoring sheet crowning, of part of a coil array containing the web of FIG. 27a.

FIG. 31 is a schematic cross-sectional view of one form of coil breakaway device contemplated by the invention;

DESCRIPTION OF THE ILLUSTRATED EMBODIMENTS

Figure 13:
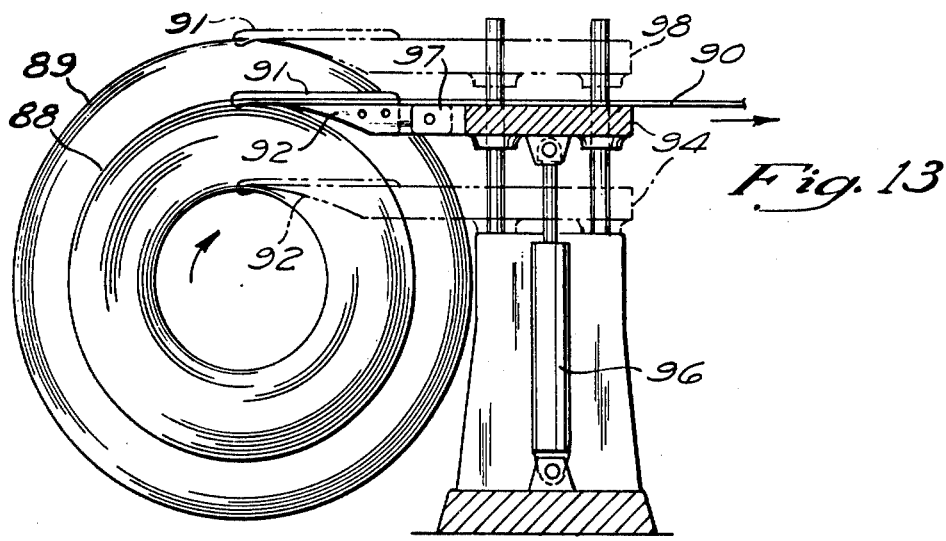
FIG. 13 is a schematic side elevation, partly in section, illustrating a means for separation of daughter coils at the point of use.

For purposes of background, FIG. 1 of the drawings discloses, somewhat schematically, a more or less conventional slitting line including an uncoiling station 10, a slitting station 12, and a coiling station 14. In accordance with accepted practice, a coil of sheet metal or the like 16 is placed upon an unwind mandrel 18 and trained through the slitting station 12.

At the slitting station upper rotary cutters, as at 20, cooperate with like cutters, not shown, disposed beneath the strip and offset with respect to the cutters 20 to slit the incoming strip into a series of narrower strips 22. The strips 22 are then rewound on a rewind mandrel 24 and a separating device 26 including separating discs 28 serves to prevent interleaving or overhang of the edges of the rewound strips 22.

It will be noted from FIG. 1, that in order to provide the necessary separation at the coiling station 14, the slitting and coiling stations must be positioned a substantial distance from each other.

Additionally and with reference to FIG. 2 of the drawings, it will be noted that the cross-sectional configuration of the sheet 16 varies considerably from an ideal rectangular configuration, shown in dashed lines in FIG. 2, with the center of the sheet actually much thicker than the edges thereof. As a result, strips cut from the center of the sheet are thicker than those cut from areas displaced outwardly from the center and the center strips are, therefore wrapped more tightly than the outside strips.

This results, as seen in FIG. 1 of the drawings, in the outer strips sagging between the slitter and the coiler. Although only a relatively small amount of sag is shown in the drawings, it will be apparent that as the slitting and coiling process proceeds, the resulting sag will be substantial, requiring pits formed between the slitter and coiler or a system of rollers for festooning the outer strips above the slitting line.

All of the above problems are obviated with the present invention by maintaining limited connection between the slit strips at the slitting station and completing their separation after the sheet has commenced coiling on the rewind mandrel. Thus, as seen in FIG. 3 of the drawings, as sheet 16 is unwound from the mandrel 18 and trained through a slitting station 30, the sheet is predivided into strips 32 while maintaining limited connection, as indicated by the dash-dot lines 34. Therefore, as the interconnected strips 32 are rewound upon the mandrel 36 they, in effect, behave as a single sheet.

As a result, there is no necessity of maintaining separation between the edges of adjacent strips, nor do the thinner strips sag between the slitter and the coiler. As will be particularly apparent from FIG. 3 of the drawings, because the necessity for lateral displacement of the strips at the coiler is eliminated the coiler may be positioned adjacent the slitter, providing a much more compact slitting line and, as will be discussed in detail below, rendering possible the use of a single piece of equipment for both partial slitting and final separation.

Compactness of the slitting line is however only one benefit of the relative adjacency between slitter and coiler. More significant is the achievement of constraints on the strips during coiling to cause them to wind with almost perfect tracking into daughter coils separated by flat side faces. It has been discovered that momentary constraints imposed by the slitting cutters on the side edges of the slit strips can be "extended," so to speak, by causing the slit strips to behave as a single sheet (by tying the edges of adjacent strips together, during or immediately following slitting, as herein described), and that such constraints can be "captured," so to speak, to be made part of the coiling operation by taking up the slit strips on a coiler before such constraints have dissipated with continuing travel of the strips away from the slitting cutters. The result is daughter coils separated by flat interfaces through which extend the breakable ties disposed for clean breakaway shearing action. The constraints can accomplish such flat interfaces despite the almost inevitable occurrence of camber in the sheet material being slit and despite the resultant camber in the slit strips, and even despite a slight degree of yaw in the feed roll supplying the sheet material to the slitter.

The close coupling between the slitter and coiler contemplated by important aspects of the invention can be eliminated, but only at a cost in reduction of tracking accuracy that will often be unacceptable or at least pointless.

Partial pre-slitting, or the equivalent, can be accomplished periodically or non-periodically, and intermittently or non-intermittently. An example of periodic non-intermittent pre-slitting is the use of flats on slitting cutters to periodically produce tacks (upon every revolution of the cutters) without skipping tacks during some revolutions. An example of periodic intermittent pre-slitting is a similar arrangement in which the slitting cutters are positioned so that tacking does not occur, but in which such slitting cutters are intermittently shifted to cause periodic tacking to occur. An example of non-periodic non-intermittent pre-slitting is the provision of slitting cutters which continually completely slit followed by immediate partial reconnection by the continuous or non-periodic action of rollers positioned just beyond the slitting cutters, without any interruption of such action of the rollers that accomplish reconnecting. An example of non-periodic intermittent pre-slitting is a similar arrangement in which the rollers that accomplish reconnecting are positioned so that such reconnecting does not occur, but in which such rollers are intermittently shifted to cause such reconnection to occur.

As noted above, pre-division can be accomplished in accordance with the present invention in a number of different ways. For example, the strip can be provided with alternating fully separated and less than fully separated sections. Separated sections of say, a few feet in length, or a few inches in length in the case of thinner material, are joined by less than fully separated sections of relatively short length. Alternatively, the strip can be continuously separated and then rejoined, as mentioned above. In some applications it may be possible that the opposed cutters 31 (FIG. 3) can be provided without flats or reliefs and adjusted to provide a continuous shear line between adjacent strips 32 with the strip sheared to a point just short of complete fracturing and the fracture completed after rewinding has commenced.

The alternative separated and unseparated areas may be produced in a number of ways, including mounting one or both of the cutters somewhat eccentrically, providing one or both of the cutters with flats or other relief shapes on their peripheries or on the faces near their cutting edges, providing a cam action or the like for adjustment of one or both of the cutters relative to each other in directions perpendicular to the face of the sheet 16. The reliefs on each cutter may be each insufficient to prevent full separation alone, but capable of doing so if in registration with the relief on the associated cutter, and the reliefs may be brought into and out of register by advancing or retarding the angular position of one cutter relative to the other, by means of a differential drive or the like, as they both continue to rotate through the cutter nip. Combinations of these arrangements may be provided.

All of the above arrangements for providing partial pre-slitting, or the equivalent thereof, can be referred to as "tacking" arrangements. The slit strips are caused to continue to move together by being tacked together, periodically or non-periodically, and intermittently or non-intermittently.

Both periodic and non-periodic or continuous tacking involve maintaining connection between the slit strip edges sufficient to cause the slit strips to wind together. Such maintaining of connection may itself be non-intermittent or it may be made intermittent by interruptions either on a pre-programmed or on a demand basis.

As an example of a demand control, as seen in FIG. 3, sensor means 33 may be provided between the slitting station 30 and winding mandrel 36 for sensing sagging or tension differences or other differences or incipient differences in winding of the slit strips. The sensor may be any appropriate device such as a tension or, as shown, a photoelectric sensor.

Cutter 31 and its companion are positioned close enough for continuous slitting until such time as the sensor 33 detects differences or incipient differences in the winding of the strips 32 whereupon the cutters are moved apart or otherwise adjusted by automatic means (not shown) sufficiently to commence maintaining periodic tacking between the edges of the strips 32 sufficient to cause them to wind together. This condition may be terminated after a given time, in terms of distance or time units, or may be terminated after winding differences or incipient differences are no longer detected.

FIGS. 4 and 5 illustrate the configuration that may result in the region of a "tack" or periodic partially separated area. The adjacent strips 32 are displaced vertically with respect to each other when they engage the cutters, and spring back together when they are fully separated. However in an area of partial separation, the adjacent strips continue to be joined by a bridge 48 of the parent metal connecting the metal of the adjacent coils and maintaining the vertical displacement of the adjacent strips 32 with respect to each other, as seen in FIG. 5, thereby maintaining an increased overall thickness of the adjacent strips (considered together as a unit) and thereby an increased overall thickness at the locations of the bridges in the turns of the array of daughter coils formed upon coiling.

FIG. 6 diagrams the momentary positions at the cutter nip of the edges a, b, c, d seen in FIG. 4 plotted against different rotative positions of the cutters. The rotative positions of the cutters corresponding to passage through the nip of the flats on the cutters are between positions e and f. The vertical locations g and h on the diagram represent the height of the top and bottom surfaces of the metal sheet prior to close approach to the cutter, and of the fully slit portions following passage through the cutter.

Even if only one cutter is relieved, the cutting action will be similar to that illustrated in FIG. 6. Although the corresponding curves would not be exactly symmetrical about a horizontal axis, they would be roughly similar to the illustrated curves because the adjacent not-yet-parted strips 32 tend to center themselves vertically between cutters even if only one cutter is relieved.

FIG. 7 illustrates the relief of a single cutter 61 designed to operate with a corresponding unrelieved cutter (not shown). The circular periphery at 62 is relieved by a flat 63 which is faired into the periphery of the cutter at ends 64 and 65.

When the metal is coiled after passing through the cutters, a plurality of daughter coils 71 are formed, as seen in FIG. 8. The transverse profiles of the turns of the array comprise raised portions 72 and notched portions 73, as seen in FIG. 9.

The notched portions such as 73 may be slightly downwardly penetrated by a succeeding wrap of the corresponding daughter coil. Thus in FIG. 9 each notch 73 is slightly penetrated by the first succeeding wrap 74 of its corresponding daughter coil 75. (Similarly the second succeeding wrap may penetrate the slight gap 76 left by wrap 74, and so forth in respect of still later wraps, but the occurence of such penetration beyond the first succeeding wrap is not illustrated). Corresponding upward penetration may also occur with respect to the reliefs under the raised portions 72, as shown, although any such upward penetration will tend to be minimized by the effect of winding tension.

The edges of the daughter coils are thereby kept in alignment to prevent edge overhang in circumstances where edge overhang might otherwise occur due to the particular circumstances of coiling. Thus a daughter coil 71a is uncoiled as in FIG. 10, there is no interference with the face 77 comprising the edges of the turns of the adjacent daughter coil 71b.

The array of daughter coils may be formed in a dished configuration as seen in FIG. 11. This may be done by shifting the coiler axially in one direction throughout the coiling operation. Each of the daughter coils 81 and each of the interfaces 86 between daughter coils is dished. The edges of adjacent daughter coils are thereby stepped in a uniform direction, as seen in FIG. 12, whereby edge overhang is avoided and no edge interference occurs when the daughter coils are individually uncoiled.

The arrays of daughter coils are removed from the rewind mandrel and shipped to the end user or the warehouseman or other middleman still interconnected. Final separation takes place as the strips are needed, using any of the final separating processes mentioned herein.

Figure 13A:
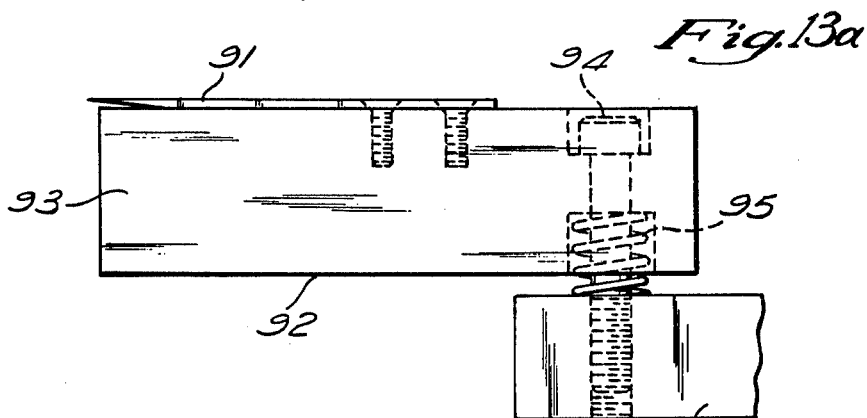
FIG. 13a and 13b are respectively fragmentary plan and elevational views of a part of the apparatus seen in FIG. 13.
Figure 13B:
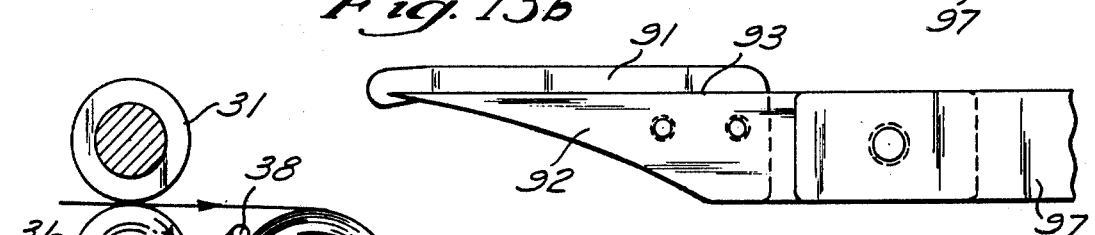

One particular arrangement for final cutting is shown in FIG. 13. Here a daughter coil 88 is being unwound from its parent coil 89, the unwrap reach being indicated by reference number 90. In this case, to aid separation of the daughter coil, a prizing blade 91 is provided as most clearly illustrated in FIGS. 13a and 13b. This blade is bolted to and held by a wedge finger 92 over which the unwrap reach 90 slides and under which the wound turns of the daughter coil 88 pass. The unwrap reach 90 slides on top face 93 of finger 92. Finger 92 is supported on a flange 97 by a pivot bolt 94 provided with a spring 95 adapted to yieldingly center finger 92 in the illustrated horizontal position. Flange 97 projects from crosshead 98 which slides vertically on four columns (two of which are shown) protruding from a pair of spaced pedestal supports (one of which is shown). Raising and lowering is done by actuating cylinder 96. The underside of finger 92 can ride directly on the still wrapped portion of daughter coil 88.

The leading edge of prizing blade 91 may, as illustrated, depend slightly below top face 93 of finger 92, so that the blade projects partly into the shear line associated with the next succeeding wrap of the daughter coil to pre-initiate separation at the turn that precedes actual unwrapping or at least to aid in maintaining the positioning of the prizing blade 91 immediately next to the edge of the adjacent layer of still wrapped coil that corresponds to the then-unwrapping layer of the daughter coil. In some cases such pre-initiation or position-maintaining aid is unnecessary and the depending portion of blade 91 can be omitted.

The prizing blade 91 acts to laterally wedge or prize the top turn of the daughter coil that is being unwrapped away from the corresponding layer of the adjacent still-wrapped coil to a sufficient extent to break the remaining connection between the two. As intimated in the foregoing description, the action may be one more of wedging or prizing than of cutting.

It will be appreciated that various combinations of partial slitting techniques and separating techniques may be utilized in accordance with the present invention. For example, after partial slitting is accomplished by any of the various methods discussed above, the cut may be completed at any time after rewinding has commenced by any of the methods described herein.

Figure 14:
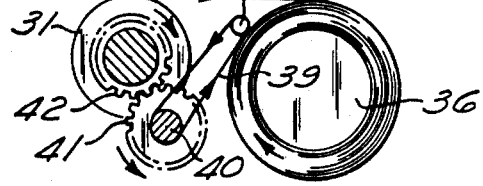
FIG. 14 is a schematic side elevation, partly in cross-section, showing an operation in accordance with the present invention where separation is completed at the coiler.

In another aspect of the invention, final separation may be accomplished upon rewind. As shown in FIG. 14, one possible method of completing the cut formed at the slitter 30 is through the use of a contoured bending bar 38 bearing against the interconnected strips 32 just as they approach the second wrap in the coil being built on the rewind mandrel 36. Because of the increased thickness at the connecting bridges, the pressure of the bar 38 bearing against the strips fractures the remaining bond between adjacent strips and completes the cut just before the strips enter the second wrap of the coil. Preferably endless belts 39 are interposed between the bar 38 and the coil being built to prevent scratching or other damage to the faces of the strips being rewound, and the belts can idle or be driven from pulleys 40 which are in turn driven by gears 41 in mesh with like gears 42 fixed to the arbor of the lower cutters.

Figure 15:
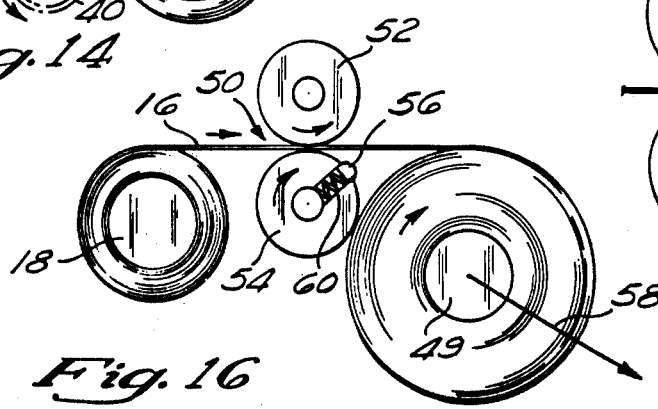
FIG. 15 is a view similar to FIG. 14 but showing a modified operation for completing separation.

Alternatively, as shown in FIG. 15, a roller 43 can be used in place of the contoured bar 38 to complete cutting of the strips as they enter the second coil. In this regard, a segmented roller 43 can be provided having relatively larger diameter areas 44 in contact with the strips adjacent their longitudinal edges and with the larger diameters 44 interconnected by smaller diameter portions 45.

In another alternative, sharpened rotary cutters (not shown) driven by motors may simply be positioned at the rewind mandrel to complete the cuts between adjacent strips 32 after they have begun to rewind on the mandrel. Of course, the unfractured areas between adjacent strips can, particularly where the material being slit is somewhat brittle, be fractured by simply controlling the rewind tension.

Figure 16:
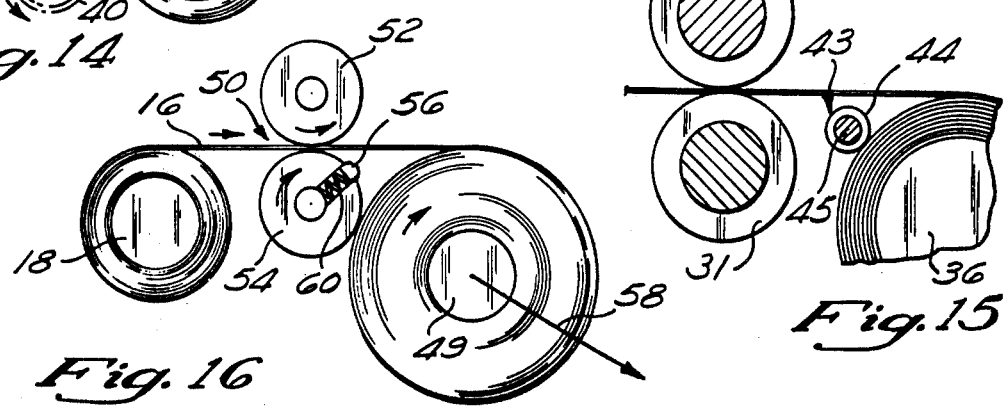
FIG. 16 is an end elevational view of a slitting operation showing another operation for completing separation.

The compactness of the slitting line that results from the partial slitting techniques of the present invention permits the incorporation into the partial slitting system of special slitting and separating mechanisms. Thus, as seen in FIG. 16 of the drawings, sheet 16 is uncoiled from the mandrel 18 and passed through a cutting station 50 before being rewound on the mandrel 49. At the cutting station 50 pairs of opposed cutters 52 and 54 are positioned above and below the sheet similarly to the opposed cutters 31.

However, cutter 54 includes a satellite cutter 56 at its periphery, spring loaded radially outwardly of the cutter 54. Mandrel 49 is mounted for movement in the direction indicated by the arrow 58 such that the relative positions of the cutter 54 and the adjacent surface of the roll being built on a mandrel are maintained during the rewinding process. Thus, as the strip 16 passes between cutters 52 and 54 it will be slit into a plurality of narrower strips except at those areas where the strip 16 is contacted by the spring loaded satellite cutter 56.

The pressure of spring 60 is selected to be insufficient to force cutter 56 completely through the strip 16 during the pass of the strip between the cutters 52 and 54. However when the partially cut areas thus produced in the strips are again engaged by the satellite cutter 56, the now partially cut areas have been weakened sufficiently that the cutter 56 may complete the cut initiated at the slitting station 50. Because the distance between partially slit areas created by the satellite cutter 56 is a function of the diameter of the cutter 54, there is an automatic synchronization which permits the partial cut areas to be presented precisely to the satellite cutters after rewinding of the strips has commenced.

Figure 17:
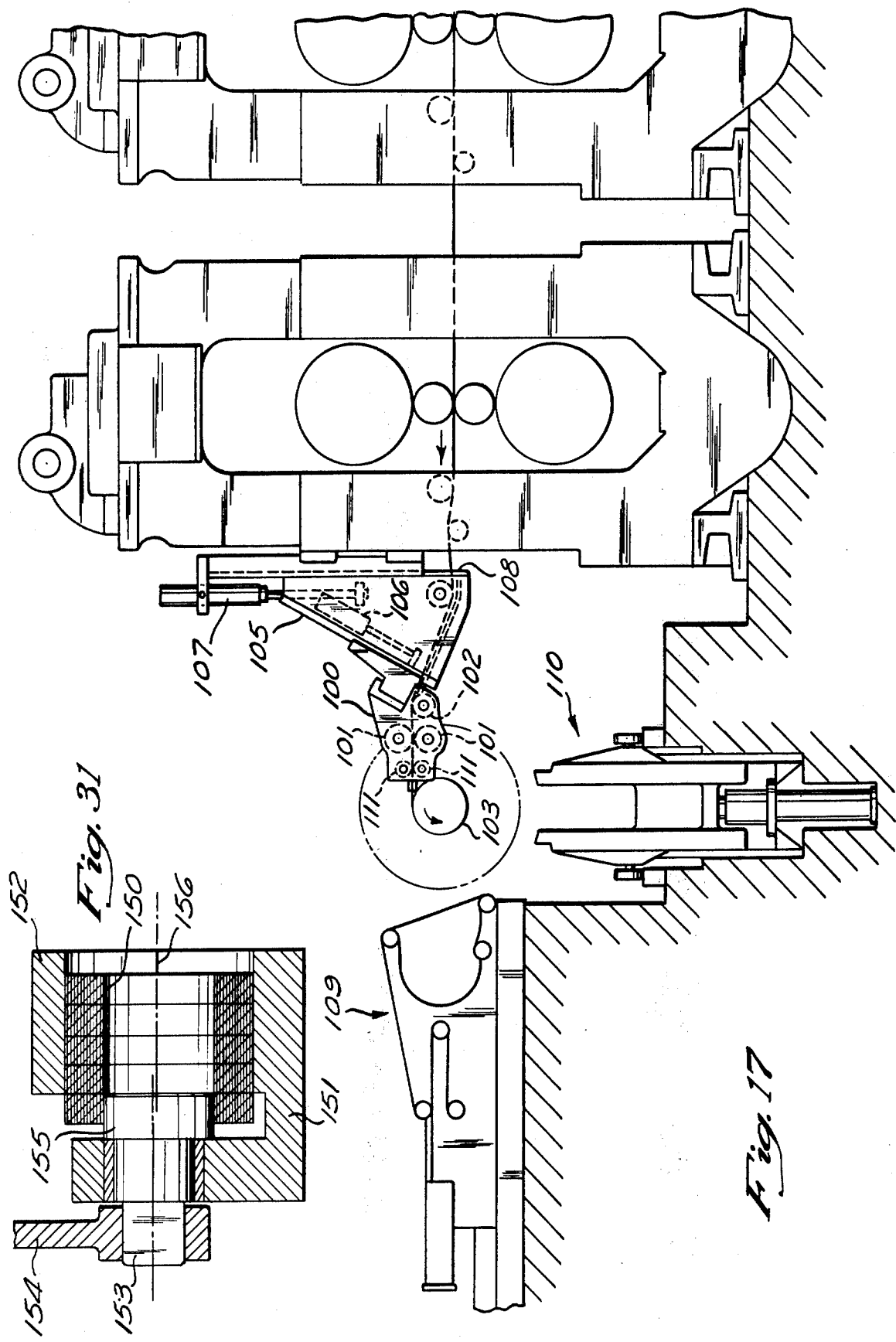
FIG. 17 is a side elevational view illustrating the use of the invention at the outfeed end of a tandem mill.

Coiling and uncoiling between milling and partial or total slitting can be avoided altogether in the practice of the invention. In FIG. 17 partial slitting is accomplished at cutter head 100 which carries a guide roll 102 and a pair of cutters 101 which, on a periodic basis, partially pre-slit the outfeed from the mill prior to coiling on the mandrel 103. The head 100 may also carry suitable conventional stripper fingers (not shown) on the infeed side of the cutters, and guide boards (not shown) on the outfeed side immediately beyond the stripper fingers. The cutter head is moved on an inclined track 105 by cylinder 106 as the coil is built to its full dimension shown in phantom. The retracting cylinder 107 moves the entire slitting assembly out of the way on slideways 108 when it is not to be used. The partially slit coil can be started on the mandrel by a conventional beltwrapper 109 and can be supported and removed after winding by a conventional coil car and lift 110. The stand on which the slitter is mounted may for example constitute the last stand of a five-stand tandem cold mill. A like arrangement may be used on a temper mill constituting only a single stand. Instead of being partly slit, the roll in FIG. 17 may be fully slit by completion of slitting by any of the means previously described as winding on mandrel 103 occurs.

In a presently preferred form of the invention, the "tacks" are not allowed to remain with the increased overall thickness as seen in FIG. 5, but are instead knocked down by passing the slit strips between a pair of knock-down rolls spaced apart a distance approximately equal to or slightly less than or, less preferably, greater than the thickness of the sheet metal prior to slitting. The bridge 48 is thereby caused to partially shear as the adjacent slit strips at the "tack" are brought back to level with each other. I have discovered that in at least some if not many applications the daughter coils will wind with good tracking and no edge overlapping even in the absence of the tracking arrangements described earlier herein due to the "capture" upon winding of constraints imposed by the slitting rolls on the side edges of the daughter-coils-to-be, as previously mentioned.

Figure 23:
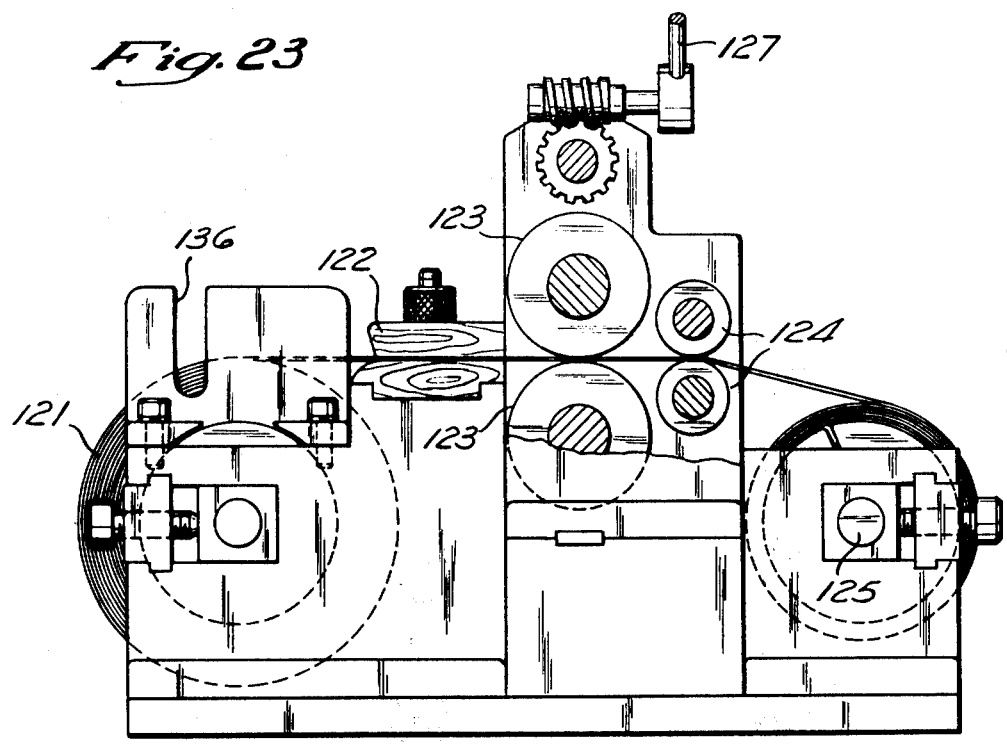
FIG. 23 is a side elevation, partly broken away, of the working model of the invention.
Figure 24:
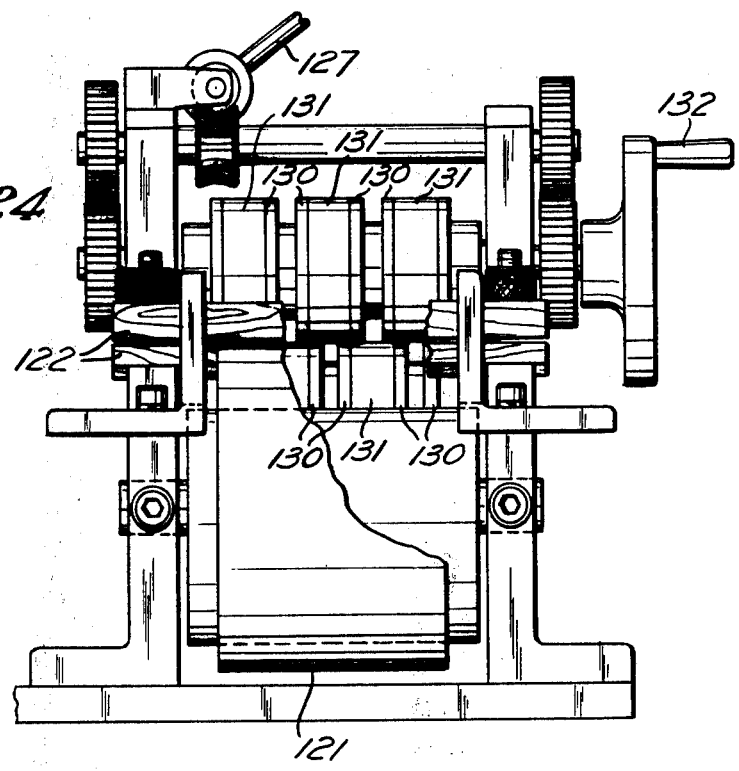
FIG. 24 is an end elevation thereof, partly broken away.

In one particular experimental set-up illustrated in FIGS. 18, 23, and 24 a steel coil 121 (FIG. 23) of 0.015 inches thickness is unwound through guide 122, rotary 3-inch slitting cutters 123, and knock-down rolls 124 to a winding mandrel 125 driven by a motor 126 (FIG. 18) through a suitable reducer and coupling. A control handle 127 operates through the illustrated gear train to change the rotative position of an eccentric mounting for the upper cutter 123, thereby adjusting the spacing between the cutters. Each wheel of the lower cutter 123 is provided with a flat as illustrated in FIG. 7, the flat being .125 inch from edge to edge and of a maximum "depth" (maximum chord-to-arc spacing) of 0.006 inches from the cutter circumference.

The cutters 123 each may include the spaced discs or cutters proper 130, coacting pairs of which on the upper and lower cutter rolls act to shear the metal, and the strippers or elastomeric sleeves 131 arranged to push the sheared metal away from the shearing edges as the metal leaves the nip. A crank 132 is provided for manually driving the upper cutter 123 during set-up.

With the dimensions given, the tacking established by the flats remains sufficiently connected even after passing through the knock-down rolls to cause the slit strips to wind together into a plurality of daughter coils 140 (FIG. 19) constituting a parent coil 141. In the illustrated example the two endmost daughter coils 140a constitute edge trim strip and are therefore considerably narrower than the other daughter coils. I have used pre-trimmed unwind rolls in experiments, giving them narrow edge cuts to simulate edge trimming.

When the handle 127 is shifted to lower the upper cutter 123, tacking ceases and the slitting is continuous. The slit strips continue to track nicely as they wind into the daughter coils being formed. As soon as a slight fluttering or looseness of one or both of the outermost or next-to-outermost daughter coils is detected, the handle is reshifted to raise the upper cutter and re-establish tacking. The fluttering or looseness immediately disappears as the slit strips are constrained by the tacking to wind together.

FIGS. 21 and 22 are schematic cross-sections of the slit strips immediately downstream of the knock-down rolls. FIG. 21 shows a region of tacking, the bridges between the adjacent strips being shown as more or less sheared but not completely parted. FIG. 22 shows a fully slit region.

Because of the crown seen in FIGS. 21 and 22, the edgeward daughter coils forming the parent coil 141 are wrapped more loosely than the more central daughter coils. However because the daughter coils are constrained to wrap together they all have the same number of turns per unit length. The "tacks" are such that the connections between adjacent daughter coils are contained entirely between the front and back faces or surfaces of the sheet metal. The front or back faces are not uninterrupted across the "tacks," as would be the case if slitting were entirely discontinued at the connecting regions. The opposite edge faces of adjacent daughter coils created by the slitting operation each have a continuous corner edge throughout the length of the daughter coils, including the "tacked" portions thereof.

The "tacks" or connections between the slit strips may be established in such a manner as to seek only a minimal constraint to cause the slit strips to wind together. Thus in the above example, when fluttering or looseness of any of the daughter coils is detected, the upper cutter 123 is not abruptly raised but instead the handle 127 is shifted enough to initiate a minimal degree of tacking which is usually too weak to both survive the knock-down bars and hold the strips together until they wind on the mandrel 125. Shifting of the handle 127 is continued until the tacking is just strong enough to re-establish the constraint of forcing the slit strips to wind together. When this constraint is established, the upper cutter may be maintained in its position or, preferably, it may again be lowered to repeat the cycle. Such lowering may be gradual and may be continued only until the looseness or fluttering is again detected. This manually controlled system can obviously be replaced by an automatic system which in effect "hunts" back and forth between a condition of being just barely able to maintain the constraint and a condition of being just barely unable to maintain the constraint.

Instead of employing the illustrated flat of a depth of 0.006 inches, I contemplate employing coacting flats on the upper and lower cutters 123, each 0.003 inches deep for a similar but more symmetric tacking action. In such case the upper and lower cutters 123 would be geared together for rotation to maintain the proper register of the flats. The cutters 123 are not geared together in the illustrated embodiment.

For better control of tacking strength as a function of roll adjustment, I propose to use shapes other than a flat. Thus in FIG. 7a the relief ground onto the cutters by a suitable grinding roll is in the form of gullwings formed by a pair of arcs whose points of tangency with the circumference of the 3-inch diameter cutter are 0.125 inches apart. The centers and radii of these two arcs are such that they intersect 0.006 inches below the roll periphery.

More preferably, two similarly configured reliefs can be provided on a pair of cutters geared to rotate together, each relief having an arc-intersect that is 0.003 inches deep.

With these shapes, the cross-sectional area of the connecting bridges formed by the relief varies with roll spacing in a more definite manner, making for more precise control. With both rolls being relieved with such a shape, as the cutters are brought together, the mirror-image "gullwings" of the two reliefs increasingly overlap to provide a diamond shape of diminishing size which will finally disappear although presumably the degree of tacking necessary for winding constraint ceases before such point of disappearance is reached.

If one of the upper and lower cutters is advanced angularly relative to the other while they turn together with the reliefs in register, such advance has the effect of "tilting" the diamond shape. This tilt can be either "forward" or "backward" depending on the relative direction of the angular advance. Such relative angular advance can be accomplished by any conventional control means which allows a differential angular movement to be introduced between two counter-rotating rolls turning together.

The two cutters can be both moved toward and away from each other and advanced angularly relatively to each other for different tacking effects.

As increasing familiarity with a given sheet material is gained, a pre-set degree of tacking may be selected. A feature of the invention is that the degree of cohesion between daughter coils can actually be modified, from parent coil to parent coil, by adjusting the strength and frequency of the tacks, as for example by adjusting the slitting cutters to make the cross-sectional extent of the individual tacks greater or less, and/or adjusting the frequency of tacking or degree of intermittent operation.

In the apparatus of FIG. 3 a knock-down roll 35 may be provided together with a similar roll underneath the strip. With the provision of the knock-down rolls, it will be understood that the configuration of the coil wound on mandrel 36 is similar to coil 141.

In FIG. 17, knock-down rolls 111 may be provided immediately beyond the cutters 101.

Figure 35:
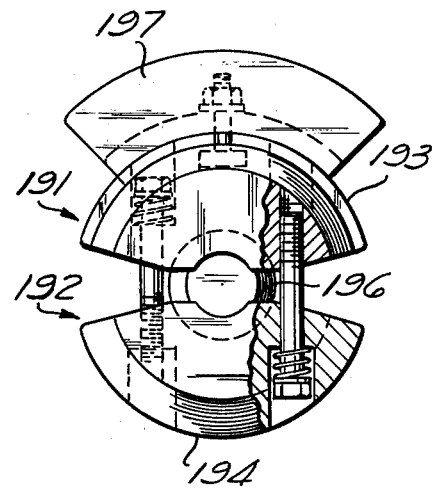

Instead of functioning as knock-down rolls, rolls such as 124 of FIGS. 18 and 23, and 35 of FIG. 3, may be set by appropriate shims or the like (not shown) to a spacing about the thickness of the sheet material being slit, or preferably slightly under such thickness, and the slitting cutters may be set to slit continuously. I have found that, under at least certain conditions, when the slits pass under the rolls 124 or 35 following their formation by the slitting cutters, they are rejoined to accomplish non-periodic tacking. In one particular experimental set-up of the apparatus illustrated in FIGS. 18, 23 and 24 dead soft copper of 0.005 inches thickness is slit and passed between the rolls 124 which are shimmed apart by shim plates (not shown) of 0.004 inches thickness to give a nominal reduction of 0.001 inch or 20%. However any actual reduction is difficult to observe in terms of sheet width growth, and is not believed to be significant. The slits are tacked or rejoined by the rolling operation, and the connection appears to be stronger in the direction of travel than in a direction perpendicular to the sheet. The rejoining is not presently clearly understood and may be a pressure welding phenomenon or the like; and/or result from mechanical interengagement of burrs or the like formed by the slitting operation. In FIG. 22a I have schematically illustrated burrs as small curved lines at the tops and bottoms of the slits seen in FIG. 22a, which is a schematic cross-section of a sheet which has been non-periodically tacked as just described, although if burrs form part or all of the interconnection they may occur at other locations within the interfaces formed by the slits as well as or rather than, as shown, toward the outer extremities of the interfaces. Such operation as described in non-intermittent since the shims cannot be changed during slitting.

Figure 26:
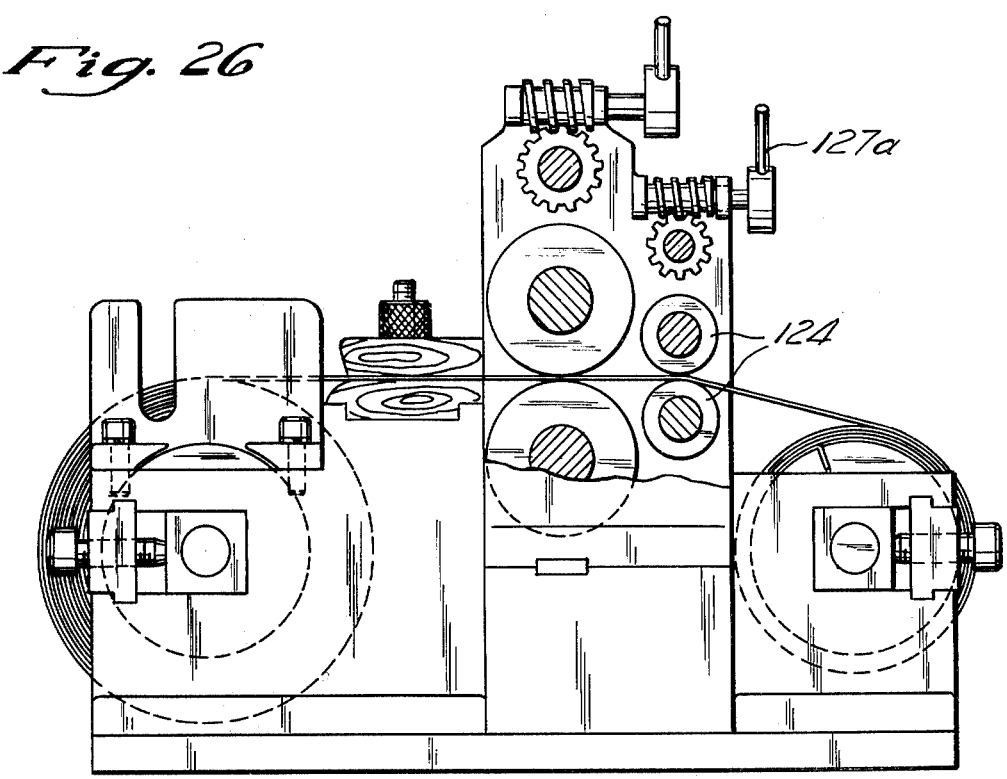
FIG 26 is a side elevation, partly broken away, of a modification of the working model seen in FIGS. 18, 23 and 24.

In FIG. 26 I illustrate a modification of the apparatus shown in FIGS. 18, 23 and 24 which includes a control hanel 127a which operates through a gear train, similarly to the handle 127, to change the rotative position of an eccentric mounting (not shown) for the upper roll 124, thereby adjusting the spacing between the rolls 124. Such handle can be shifted from a tacking position at which the rolls 124 are fairly close together to a non-tacking position at which the rolls are spaced apart to thereby give an intermittent type operation. To some degree, adjustment of tacking strength may be possible by adjustment of spacing of the rolls 124 through a range, from relatively strong at relatively close spacing to progressively weaker at progressively less close spacing.

Figure 25:
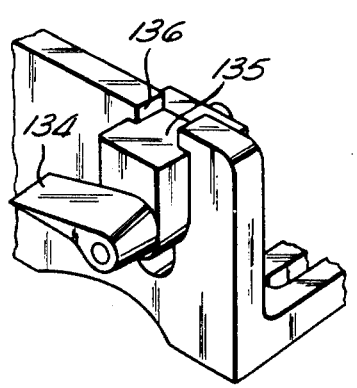
FIG. 25 is a view of a sciving tool used in the model.

The interconnections between the daughter coils such as the coils 140 are breakable either by unwinding such as that described in connection with FIG. 13 or by simultaneous breaking away of all connections. In the experimental apparatus of FIGS. 18, 23 and 24, unwinding separation can be accomplished by removing mandrel 125 with roll 141 on it from the wind-up station, turning it end for end, and substituting it for the original unwind mandrel (for the original unslit roll 121) at the unwind station. A single edgemost daughter coil 140, or 140a if the original roll 121 was not pre-trimmed, is trained over a wedge finger 134 pivoted on a slide 135 (FIG. 25) carried in a frame 136 (FIGS. 18, 23, 25) and through any suitable guide such as the knock-down rolls (the cutters may be moved apart if in the way). The leading ends of the remaining daughter coils 140 are taped down to the parent coil 141 to prevent them from flapping and snagging. The wedge finger 134 may be thinnest at its inboard side and increase in thickness toward its outboard side, as indicated by the flare of the stem portion of the finger seen in FIG. 25, to provide good lifting or prizing action. Unwinding may be done manually by pulling on the unwinding strip. As the daughter coil unwinds, the slide 135 allows the finger 134 to follow the diminishing periphery. A slight drag is applied to the parent coil 140 to prevent it from overrunning. The unwinding strip breaks readily and clearly from the parent coil. Subsequent daughter coils can be similarly unwound by shifting the frame bracket in which the slot 136 is formed laterally by the width of a daughter coil in order to establish the proper lateral position for the finger 134. The bracket is held in adjusted position on the fixed frame by the illustrated hold-down bolts.

I have found that in many cases a prizing device such as wedge finger 134 is unnecessary and the daughter coils will unwind readily in response to an unwinding pull, even that imposed only by the unsupported weight of a just-unwound reach or fall of daughter coil material.

Figure 27:
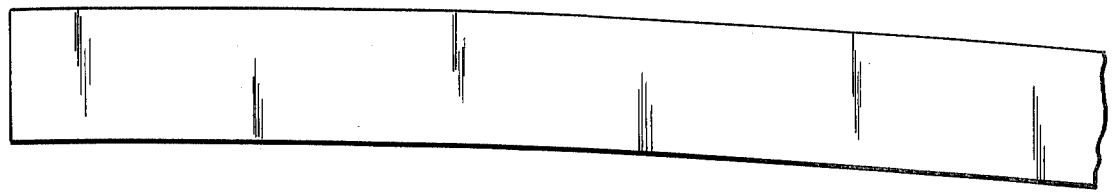
FIG. 27 is a schematic fragmentary foreshortened view of a slit strip or unwound daughter coil containing camber.
Figure 28:
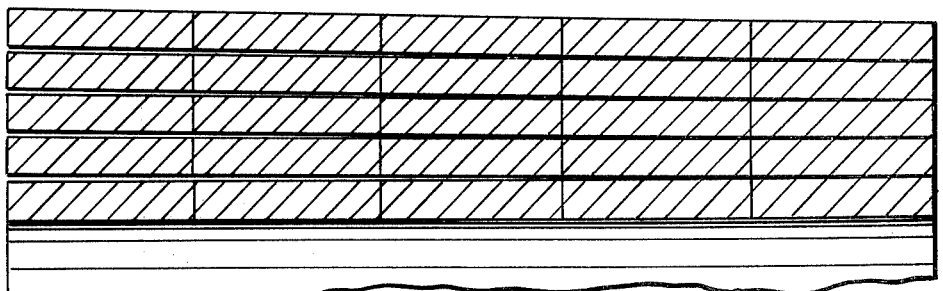
FIG. 28 is a schematic fragmentary cross-sectional view, ignoring sheet crowning, of part of a coil array containing the strip of FIG. 27.

As previously indicated, the constraints on the strips during coiling that can be accomplished by the invention provide flat interfaces between daughter coils despite almost inevitable cambering of the sheet material and the slit strips formed therefrom. The camber is accommodated by variations in tightness of wrap as schematically illustrated in FIG. 28. FIG. 27 shows on a reduced scale one of the strips resulting from uncoiling one of the daughter coils of FIG. 28, with camber clearly present. Nevertheless, the interfaces between daughter coils are substantially planar as seen in FIG. 28. Thus, although in a general sense "tacking" according to the invention causes all daughter coils to wind together at the same uniform lengths per unit turn despite variation in their thicknesses, there are specific slight variations from one daughter coil to the other of turns per unit length, such variations being a function of the degree of camber being encountered. More precisely, there are very slight differences in tightness of wrap of the opposite side edges of each daughter coil, beyond that incident to sheet crowning, just sufficient to accommodate the camber in each coil. It appears that the invention can force these slight variations in turns per unit length and these slight differences in tightness of wrap of opposite side edges of each daughter coil to occur to just the extent necessary to accomplish the substantially planar interfaces between daughter coils.

Figure 27A:
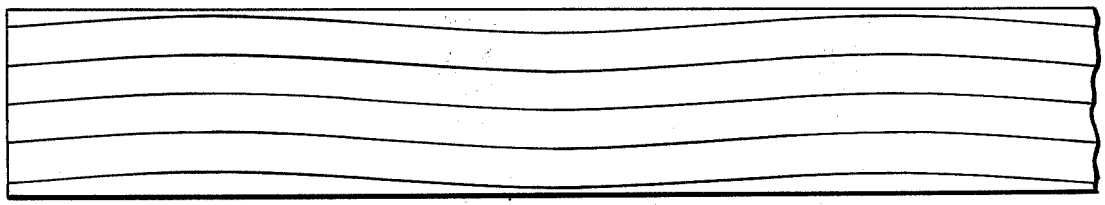
FIG. 27a is a foreshortened view on a smaller scale showing an elongated web of sheet material with serpentine or reversing camber.
Figure 28A:
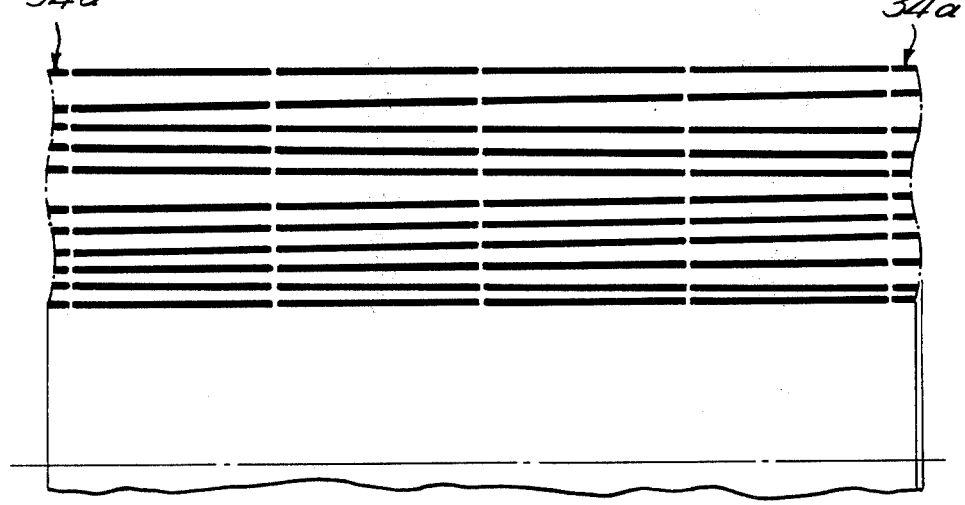

FIGS. 27a and 28a illustrate, even more schematically, the situation when the camber is serpentine or reversing, as may be caused for example by slight variations in the feed to the slitting cutters. In FIG. 28a the interfaces between adjacent pairs of daughter coils are flat despite the camber, and the two side edges of each daughter coil and of the parent coil incrementally along their lengths differ from each in tightness of wrap, beyond the differences incident to crowning of the sheet from which the coils are formed, as a function of the degree and direction of camber of the strip material incrementally along its length. FIG. 27a shows on a reduced scale the development of the coil shown in FIG. 28a, illustrating the serpentine or reversing nature of the camber. In such a situation the outside ends of the parent coil may be very uneven, as seen in FIG. 28a, yet the interfaces between adjacent daughter coils are flat, as shown.

FIG. 28a also illustrates parts of the disc-like coils of scrap, indicated at 34a, that can be used to protect the edges of the parent coil in trans-shipment, as previously mentioned, and that can be broken off or unwound from the parent coil either prior to trans-shipment or by the final user. Such discs of scrap are not specifically illustrated in FIG. 3 due to the small scale thereof.

The outer ends of the parent and daugther coils may be secured against unwinding by being taped down to the next turn of material. For trans-shipment it may be desirable to band the parent coil through the coil core say with three bands spread 120 degrees apart. The disc-like coils 34a of scrap or edge trim protect against the bite of the banding.

Although the outside edges of the edge trim coils may be quite irregular, as shown, the internal interfaces are flat, as also shown in FIG. 28a.

Figure 29:
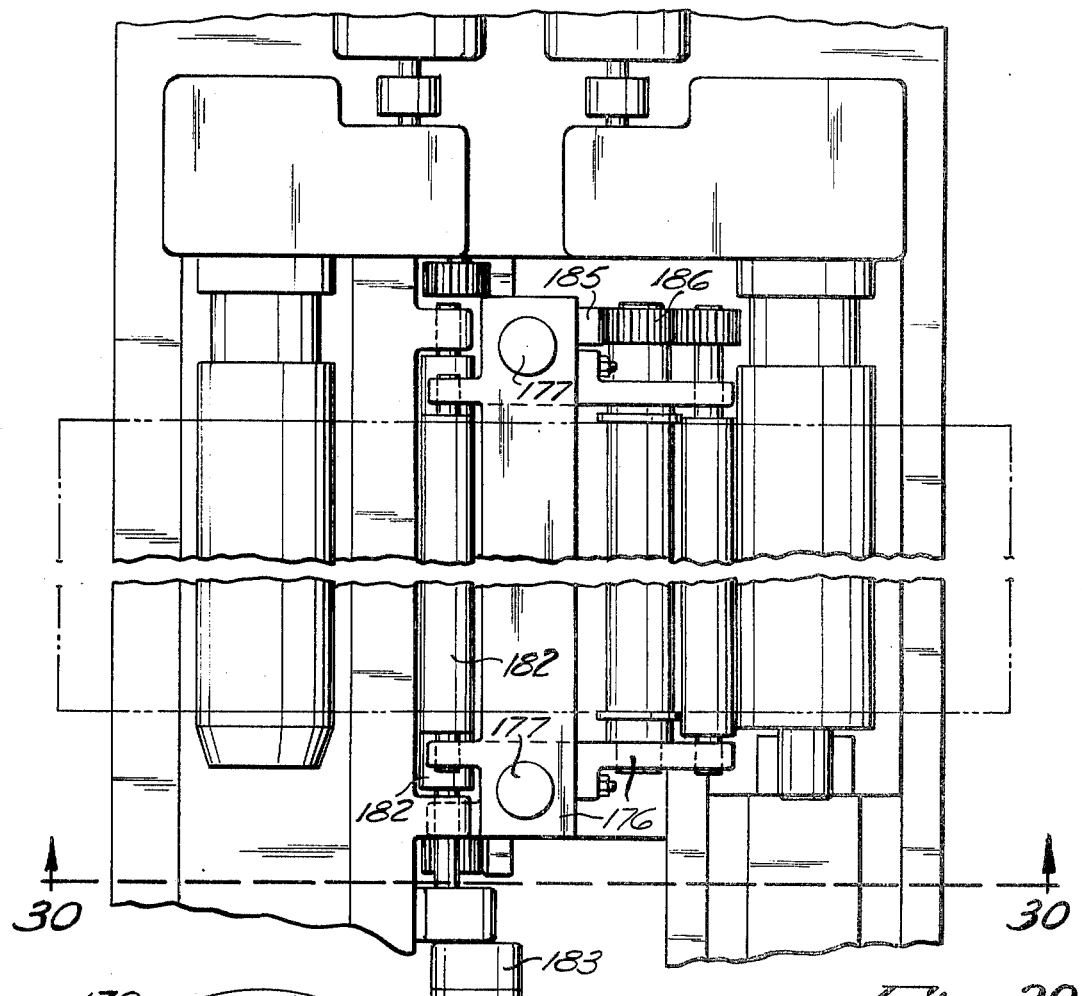
FIG. 29 is a plan view, partly broken away, of a slitting line with automated threading contemplated by the invention.
Figure 30:
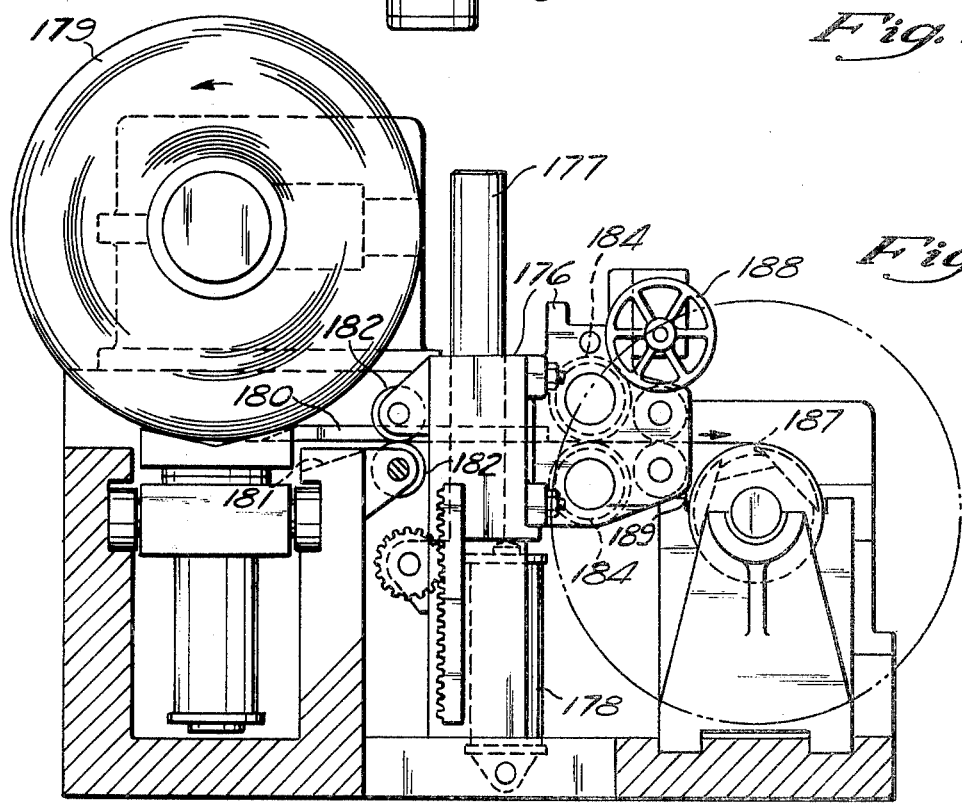
FIG. 30 is a side elevation, partly in section, taken on the plane of line 30—30 in FIG. 29.

A slitting line embodying novel self-threading concepts is illustrated in FIGS. 29 and 30. The pass line is relatively constantly horizontal. A slitter carriage 176 is vertically movable on the posts 177 by a cylinder 178, the carriage being further constrained in a well-known manner against cocking to one side or the other by the illustrated fixed racks and coacting linked pinions carried at each side of the carriage.

The coil stands are driven by DC motors which can also act as back drag generators. The leading end of the off-feed coil 179 is slowly driven forward to be initially peeled by a retractable peeling member 180, and to be guided by a fixed rise surface 181 to pinch rolls 182. The lower pinch roll is on a fixed mounting while the upper one is mounted on carriage 176 which is raised slightly and then lowered to accept and then tightly engage the leading end to the slitter cutters 184 of the tacking type contemplated by the invention. An auxiliary slitter drive including a cylinder (not shown), a vertically moving rack 185 and a spur gear 186 enclosing a one-way overrunning clutch (not shown) powers the slitters, the "threading" stroke of the rack 185 being just sufficient to advance the leading end, which is now "tacked" as will be seen below, from its point of first engagement with the slitters through the illustrated knock-down rolls and to the take-up mandrel, and into position as shown to engage or be readily brought into engagement with the lip 187 which has been formed in a conventional manner by the initially collapsed segments of the take-up mandrel. The mandrel is then expanded to cause the lip 187 to grip the "tacked" leading end to complete threading.

The flats (not shown due to small scale) on the slitter cutters are positioned to place "tacks" at or very near the leading end of the strip when it first engages and is driven through the slitter cutters. This positioning of the flats may be automatically accomplished by any suitable means, such as an index cam (not shown) associated with one of the slitter cutters and adapted to control a solenoid to deactivate the advance of the actuator for the rack 185 at the proper position during an "indexing" stroke prior to the "threading" stroke previously described.

In the illustrated apparatus, the handwheel 188 may actuate a gear linkage (not shown) to control spacing between the slitter cutters 184 and thereby control the depth of tacking and to also perphaps only apply tacking intermittently.

As slitting proceeds, a microswitch or other sensor (not shown) at corner 189 on the slitter carriage buildup of the coil on the take-up mandrel and actuates cylinder 178 on a demand basis. The carriage 176 thereby continues to rise during the slitting operation, and the pass line continues to be generally horizontal until slitting is completed.

The off-feed coil is originally carried onto its mandrel by the coil car illustrated in FIG. 30.

The ready threading just described is to be contrasted with the difficulties of setting up for conventional slitting, particularly the necessity to properly start, thread and clamp to the mandrel each separate strip being slit.

An experimental breakaway device for simultaneously breaking away all the connections of a daughter coil is schematically illustrated in FIG. 26. A parent coil is clamped on a frame 151 by a clamping member 152 releasably fixed to the frame at parting line 156 by clamping bolts or other clamping fasteners (not shown). The endmost daughter coil is received on a mandrel 155 which is initially aligned with the open core 150 of the parent coil. The mandrel 155 is eccentrically mounted in the frame 151 and has a squared end 153 which receives a wrench 154. Turning the wrench turns the mandrel 155 in its eccentric mounting and twists the endmost daughter coil relative to the adjacent daughter coil, causing the endmost daughter coil to break away. The break is clean and the points of former connection between the coils are barely discernable, if at all. To break off a succeeding daughter coil, the clamp is loosened and the parent coil is adanced to the left by the width of one daughter coil and reclamped.

Figure 33:
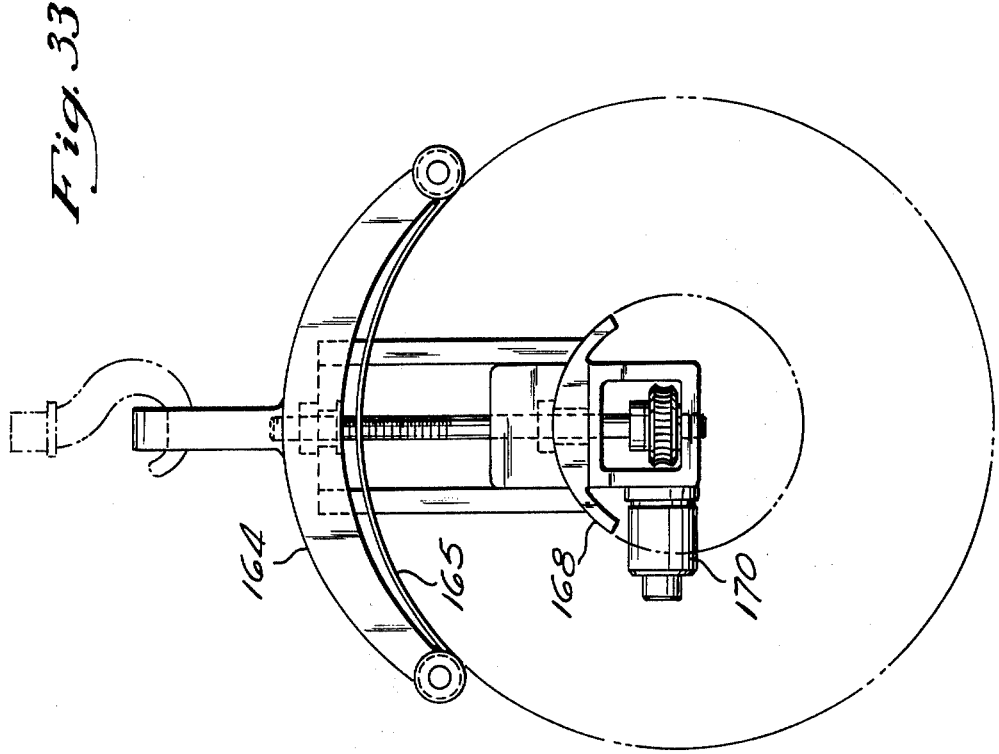
FIG. 33 is an end elevation of the device seen in FIG. 32.
Figure 32:
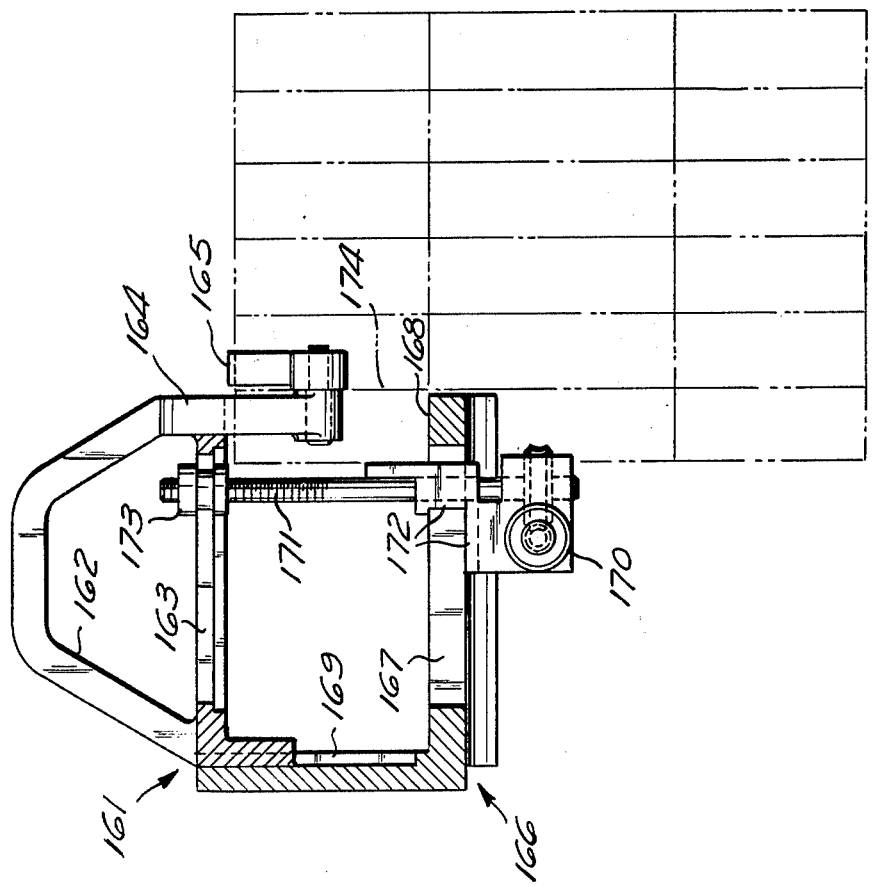
FIG. 32 is a side elevation, partly in cross-section, of another breakaway device in the form of a coil breakaway grab.

A breakaway grab device such as illustrated in FIGS. 32 and 33 can be utilized by the end user of the pre-slit parent coil in a manner that can be more efficient than conventional practice and require little change from conventional practice in utilizing ordinary handling equipment such as cranes or lift trucks to transport and position individual coils broken away from the parent coil. The illustrated grab includes an upper frame 161 which includes a suspension eye 162, a slideway 163 and a yoke 164. An upper gripping strap 165 of somewhat flexible material such as a flexible steel strap is pivoted on small stubs carried at each end of the yoke 164 in the manner shown.

A lower frame 166 includes a slideway 167 and an arcuate lower gripper 168. The upper and lower frames slide with respect to each other along a slideway 169. A clamping linkage including the motor 170 and screw 171 is associated with a clamp drive frame 172 received in the slideway 169 and a screw nut 173 received in the slideway 163.

The device may be suspended from a crane in the manner shown. To break away a daugther coil the member 168 is slipped into the coil and under the endmost daughter coil with the strap member 165 positioned just beyond the endmost daughter coil and over the next daughter coil, so that the members 165 and 168 engage the coil on opposite sides of the plane of the interface 174. The motor 170 is then actuated to close the clamp whereby the endmost daughter coil breaks away but rests on the member 168 with the outer side face of its upper half perhaps lightly engaged or at least retained by slight interference with one side of the strap member 165. The separated daughter coil can then be transported to its particular place of use by the crane and can be released by actuating the motor 170 to open the clamp to the point where the strap 165 no longer interferes with the outer side face of the daughter coil.

The slideways 163 and 167 allow the clamping linkage to be adjusted laterally for accommodation of daughter coils of different widths, since it is generally desirable to position the linkage as close as possible to the endmost daughter coil prior to breakaway.

Instead of or in addition to the eye 162, mounting brackets (not shown) can be provided to fix the frame member 161 or 166 to the lifting member of a lift truck. Or any special carriage or the like (not shown) may be provided for the grab.

Figure 34:
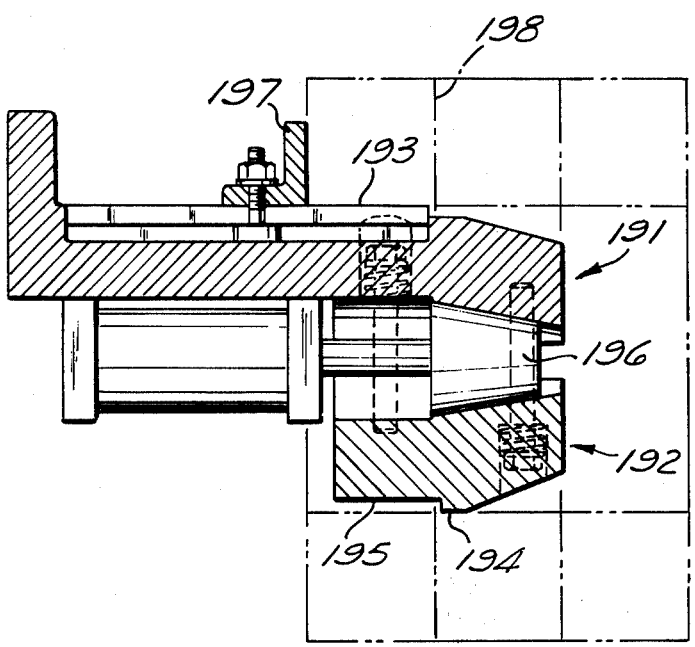
FIGS. 34 and 35 are side and end elevations of another breakaway grab.

Another form of grab is shown in FIGS. 34 and 35. A pair of clamping members 191 and 192 are shaped to penetrate the core of a parent coil and engage different segments thereof. Member 191 engages the coil at arcuate face 193 and member 192 engages the coil at arcuate face 194. Members 191 and 192 may be tapered forwardly as shown to aid in guiding the insertion of the grab. The members are urged apart by the illustrated hydraulically powered frustro-conical wedging member 196 against the biasing of springs associated with draw rods or bolts which guide members 191 and 192 in their relative motion in the manner illustrated.

A stop member 197 defines the depth of penetration of the grab, and its position may be adjusted along a marked scale (not shown) by loosening and retightening a tie-bolt in a T-slot, as illustrated, to thereby set the depth of penetration of the grab according to the thickness of the daughter coils.

Surfaces 193 and 194 terminate in slightly spaced relationship from each other so that they may be spaced slightly to each side of the interface 198 between the adjacent segments they are grabbing, as shown in FIG. 34. This reduces the criticality of the magnitude of the depth of penetration of the members 191 and 192.

Means (not shown) is provided to fix the back end of the member 191 to the lifting member of a lift truck, or to suspend it from a crane or mount it on a special carriage for the grab.

When the endmost daughter coil is broken off by expansion of the members 191 and 192, this coil remains supported on the surface 193. At this point the grab may be slightly contracted and backed out of the core far enough to clear member 192 from the daugther coil which it engaged. The members 191 and 192 may be then expanded again, to a further degree, until the relief surface 195 engages the core of the broken off daughter coil. The coil is now securely grasped and may be tilted in handling, if desired.

It may be noted that when a daughter coil is unwound from the parent coil, rather than being broken away as just described, the unwinding may be arranged to give a spreading action whereby the path of movement of the separating strip has a vector component parallel to the roll axis. (One example of such an arrangement is shown in FIG. 13 and involves use of the prizing blade 91.) Movement along such vector cannot be accommodated by flexing of the strip material around the axis of the roll but rather is stiffly resisted by reaction forces parallel to the axis and to the surface of the strip material. Unwinding arrangements involving a separating movement with such a vector component therefore can be very effective in subjecting the tacks to concentrated tensile stresses for good breaking action. In some instances this can be accomplished by gravity alone, as when a starting end of an endmost daughter coil is dropped from the lower end of a parent coil which is tilted toward a vertical position so that the starting end continues to unwind by its own weight. I have unwound hand-held experimental coils in this manner, allowing the endmost daughter coil to rapidly unwind in a falling helix and accumulate as loose strip on the floor, with the remainder of the parent coil remaining intact and the exposed side of the next-to-endmost daughter coil remaining a smooth and well-defined surface.

It may also be noted that the compactness of the slitting line contemplated by the present invention increases the practicality of shielding the fast-moving slit edges for the protection of the operator (although no such shielding is shown in the drawings). This is therefore one respect in which the invention offers substantial safety advantages.

From the above it will be apparent that the present invention provides a fresh approach to the solution of problems associated with conventional slitting operations.

While the methods and forms of apparatus and constructs herein described constitute preferred embodiments of the invention, it is to be understood that the invention is not limited to these precise methods and forms of apparatus and constructs, and that changes may be made therein without departing from the scope of the invention.

What is claimed is:

1. A construct of wound elongated sheet metal web material having a plurality of laterally spaced, longitudinally extending parting lines in the surface thereof forming severably interconnected coiled strips defining daughter coils therebetween, each of said parting lines being cut in the surface of said web material continuously along its length to expose uninterrupted oppositely facing edge faces of adjacent strips, and residual portions of web material of less thickness than the thickness of the web material bridging the interstice between said opposed edge faces forming frangible connecting means between adjacent strips.

2. A construct as recited in claim 1 in which the coiled strips in corresponding turns are disposed in substantial coplanar relation.

3. A construct as recited in claim 1 in which said residual portions are intermittently spaced along the length of said parting lines.

4. A construct as recited in claim 1 in which said residual portions are at least partially sheared.

5. A construct as recited in claim 4 in which said residual portions are sheared to the point of breakthrough, opposed edge faces of adjacent strips being frangibly interconnected by the interengagement between upset imperfections in said opposed edge faces.

6. A construct as recited in claim 5 in which the turns of said strips and the parting lines therebetween are disposed in radial alignment throughout the thickness of the construct whereby each respective daughter coil is detachable from the construct by the concurrent fracture of the interengagements between opposed edge faces along the associated parting line.

7. A construct as recited in claim 3 in which said sheet metal web material is sheared to the point breakthrough along a portion of the length of said parting line and sheared to a point short of breakthrough at intermittent locations to form said residual portions.

8. A construct as recited in claim 7 in which the turns of said strips and the parting lines therebetween are disposed in radial alignment throughout the thickness of said construct whereby each respective daughter coil is detachable from said construct by the concurrent fracture of said residual portions.

9. A construct as recited in claim 1 in which said sheet metal web material is crowned and the tightness of wrap of adjacent daughter coils is unequal.

10. A construct as recited in claim 9 in which the tightness of wrap of the respective daughter coils decreases from the axial midpoint of said construct.

11. A construct as recited in claim 1 in which the endmost daughter coils on opposite ends of said construct define edge trim coils.

* * * * *

UNITED STATES PATENT AND TRADEMARK OFFICE
CERTIFICATE OF CORRECTION

PATENT NO. : 4,170,691
DATED : October 9, 1979
INVENTOR(S) : John W. Rogers

It is certified that error appears in the above-identified patent and that said Letters Patent are hereby corrected as shown below:

Column 1, line 68, change "slits" to -- slit --.

Column 6, line 27, after "approach", change "is" to -- in --.

Column 16, line 54, change "in" to -- is --.

Column 16, line 58, change "hanel to -- handle --.

Column 18, line 28, change "daugther" to -- daughter --.

Column 19, line 20, after "carriage", insert -- senses --.

Column 21, line 11, after "forces", insert -- acting --.

Signed and Sealed this

Nineteenth Day of February 1980

[SEAL]

Attest:

SIDNEY A. DIAMOND

Attesting Officer     Commissioner of Patents and Trademarks